United States Patent [19]

Yamamoto

[11] 4,392,162

[45] Jul. 5, 1983

[54] DIGITAL VIDEO SIGNAL REPRODUCING APPARATUS

[75] Inventor: Kaichi Yamamoto, Tokyo, Japan

[73] Assignee: Sony Corporation, Tokyo, Japan

[21] Appl. No.: 192,196

[22] Filed: Sep. 30, 1980

[30] Foreign Application Priority Data

Oct. 4, 1979 [JP] Japan .................................. 54-128338

[51] Int. Cl.³ .......................................... H04N 5/785
[52] U.S. Cl. ..................................... 360/10.3; 360/22; 360/84; 360/38.1
[58] Field of Search .................... 360/10, 22, 36, 84, 360/61, 77, 38, 33, 71, 33.1, 10.1, 10.3; 358/127, 128.5, 128.6, 4, 8, 337, 339, 342

[56] References Cited

U.S. PATENT DOCUMENTS

| | | | |
|---|---|---|---|
| Re. 30,756 | 9/1981 | Maxey | 360/84 |
| 2,921,990 | 1/1960 | Ginsburg et al. | 360/84 |
| 3,158,846 | 11/1964 | Silverman | 360/71 |
| 3,320,590 | 5/1967 | Rovell | 360/61 X |
| 3,371,157 | 2/1968 | Bushway | 360/22 |
| 3,569,618 | 3/1971 | Inaba et al. | 360/61 |
| 3,721,773 | 3/1973 | Kluge | 360/22 |
| 3,769,465 | 10/1973 | Wellbrock | 360/77 X |
| 3,780,266 | 12/1973 | Mudsam et al. | 360/77 X |
| 3,921,132 | 11/1975 | Baldwin | 360/33 X |
| 3,921,209 | 11/1975 | Yoshino et al. | 360/33 X |
| 4,179,717 | 12/1979 | Maxey | 360/84 |
| 4,197,562 | 4/1980 | Kikuya et al. | 360/10 |
| 4,318,146 | 3/1982 | Ike et al. | 360/84 X |

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

Apparatus is provided for use in a digital video signal playback device of the type having a record medium in which plural channels of digital video signals are recorded in a like plurality of tracks. Plural transducers, such as playback heads, are associated with respective ones of the channels and reproduce the digital video signals from the plural tracks, each transducer normally reproducing a respective, predetermined channel of the digital video signals. A detector detects the particular channel with which the digital video signal reproduced by each transducer is associated. A signal interchanger is provided with plural channel outputs and is responsive to the detector for directing digital video signals which have been reproduced by transducers associated with channels which differ from the channels of the reproduced digital video signals to the proper channel outputs as determined by the detector. Thus, regardless of the particular transducer which reproduces the digital video signals from a track, that digital video signal nevertheless is supplied to its proper channel output.

16 Claims, 36 Drawing Figures

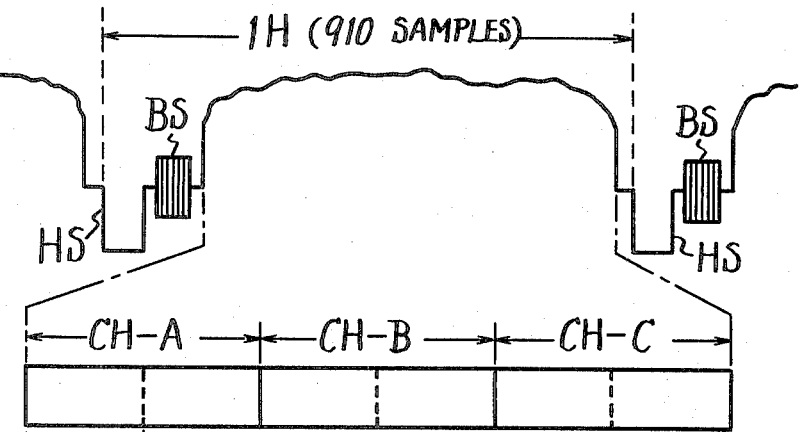
FIG. 7A
FIG. 7B
FIG. 7C
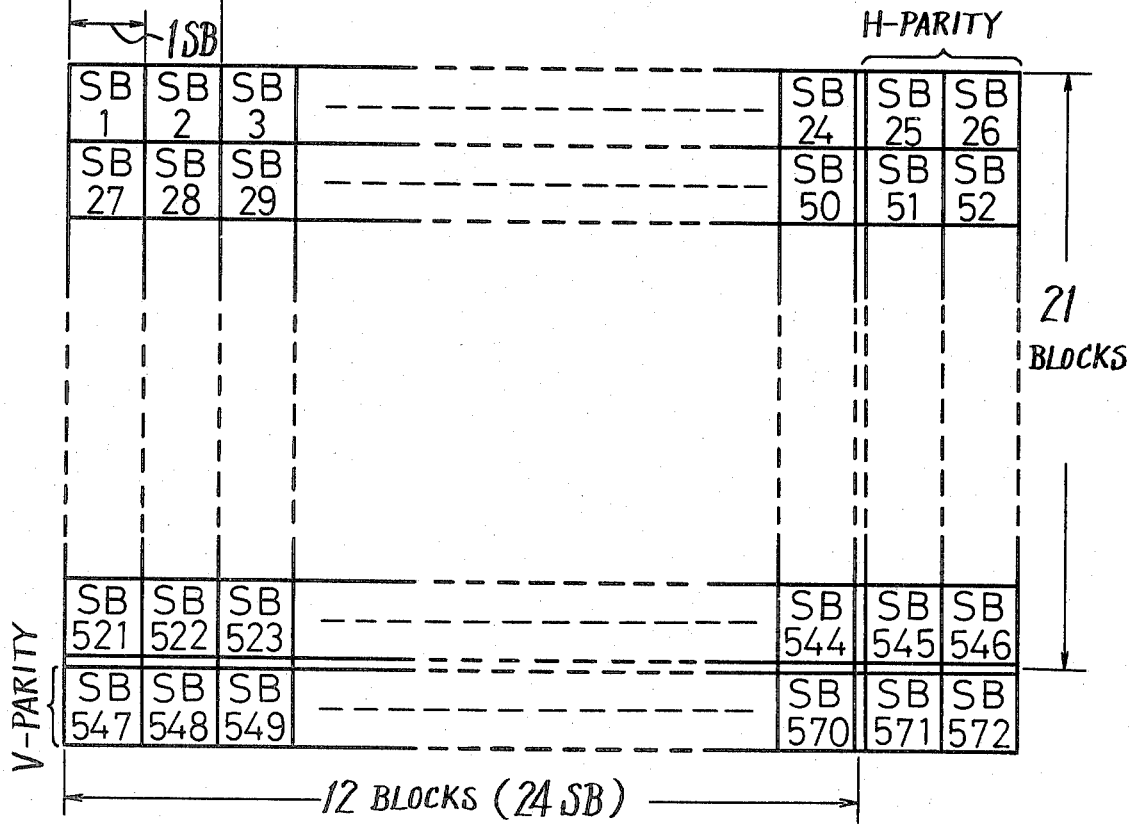
FIG. 8

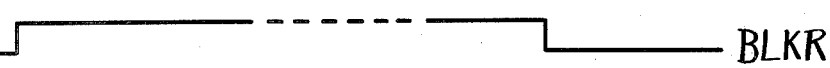
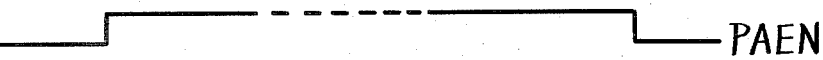

DIGITAL VIDEO SIGNAL REPRODUCING APPARATUS

BACKGROUND OF THE INVENTION

This invention relates to digital video signal reproducing apparatus, such as a digital video tape recorder (VTR) wherein each line of video information is digitized, and each digitized line is separated into separate channels which are recorded, and, more particularly, to apparatus which is capable of reproducing such plural-channel digitized video signals in special reproducing modes, such as fast search, reverse, stop-motion and the like.

Recently, digital video tape recorders (VTR's) have been developed for recording an analog video signal in digital form. In a typical digital VTR, one or more rotary magnetic heads scan successive, parallel, skewed tracks across the magnetic tape, and digitized video signals are recorded in such tracks. Each line interval of video information is sampled at a relatively high sampling rate on the order of about 3 to 4 times the chrominance subcarrier frequency $f_{SC}$; and these samples are converted to, for example, 8-bit digital words. Each word thus represents a sample of the analog, composite color video signal. Because of the very high recording density which is needed to record such a digitized video signal, it has been suggested that the samples which constitute each line interval be recorded in separate channels, or tracks, on the magnetic tape. To facilitate such separate-channel recording, groups of digitized samples are formed into sub-blocks, each sub-block being constituted by a multiple of words, and then the sub-blocks are recorded in separate, parallel channels by, for example, separate, aligned recording heads which simultaneously scan such tracks. During reproduction of such digitized video signals, playback heads, which may be the very same heads that were used for recording, reproduce the sub-blocks from the respective tracks. Then, after correcting for time-base errors, recording/reproducing errors, and the like, the separate channels of digitized video signals are merged; and the original, analog composite color video signal may be recovered therefrom.

It is desirable to provide such digital VTR's with the same versatility as found in commercially available analog VTR's. Accordingly, a digital VTR desirably should be capable of operating in special reproducing modes in addition to the normal reproducing mode. Typical of such special reproducing modes, as currently available in analog VTR's, includes a fast-search mode, wherein the video tape is driven in the forward direction at a relatively fast speed and a so-called fast-motion video picture is reproduced which enables a viewer to visually scan the recorded video signals until a desired segment of information is reached. In this quick search mode, the video tape normally is driven at a speed on the order of 10 or a multiple of 10 times the normal tape speed which is used for recording and normal reproduction. At such high tape speeds, the playback heads of a digital VTR normally will traverse tracks of different channels. For example, playback head A will traverse tracks A, B, and so on so as to reproduce the digitized video signals, or sub-blocks, from each track which is scanned. This means that, although a particular playback head is associated with a particular channel, and although a respective track has sub-blocks associated only with a predetermined channel recorded therein, that playback head will reproduce sub-blocks from the proper channel as well as sub-blocks from different channels. Since a particular playback head thus picks up data from one or more channels with which it is not associated, such data interferes with the satisfactory recovery of video information. That is, the reproduction of data from channel B by playback head A results in serious degradation of the video information which is reproduced from the magnetic tape. For this reason, the implementation of special reproducing modes in digital VTR's heretofore has been difficult, expensive and complicated.

OBJECTS OF THE INVENTION

Therefore, it is an object of the present invention to provide improved apparatus for use with a digital VTR which enables that VTR to operate in special reproducing modes.

Another object of this invention is to provide apparatus for use in a digital video signal playback device wherein data signals which are recorded in specific channels can be reproduced and recovered properly, regardless of the particular playback heads which reproduced those channels.

A further object of this invention is to provide a digital VTR which is capable of operating in special reproducing modes, such as the quick search mode, and which overcomes the aforenoted disadvantages of the prior art, is relatively inexpensive and uncomplicated.

An additional object of this invention is to provide a digital VTR for reproducing digital video signals which are recorded in parallel tracks that are associated with designated channels, each track containing only a portion of the video information of at least one field interval, wherein the digital signals which are reproduced from the respective tracks are used to recover the original video information even if the VTR is operated in a special reproducing mode of the type wherein heads which are associated with designated channels scan tracks in which digital signals of different channels are recorded.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for use in a digital video signal playback device of the type having a record medium in which plural channels of digital video signals are recorded in a like plurality of tracks. This apparatus includes plural transducers, such as playback heads, associated with respective ones of the plural channels for reproducing the digital video signals from the tracks, each transducer normally reproducing a respective predetermined channel of digital video signals. A detector detects the particular channel of the digital video signal which has been reproduced by each transducer. Regardless of the particular transducer which reproduces that digital video signal, the signal is directed to a proper channel output, that is, an output associated with the very same channel as the digital video signal, in accordance with the detection of the particular channel to which that signal belongs.

In a preferred embodiment, the record medium is a magnetic tape, and the digital video signals are recorded in sub-blocks, each sub-block being formed of a plurality of digitized samples of a portion of a line interval, whereby each line interval is recorded in separate sub-blocks in respective tracks. These tracks are scanned simultaneously by the playback heads which, normally, traverse only those tracks of corresponding channels. However, during a special reproducing mode, each head may scan tracks of different channels so as to reproduce digital video signals of such different channels. Nevertheless, the apparatus of the present invention functions to segregate the reproduced digital video signals from a channel, regardless of the particular head which reproduces that signal.

BRIEF DESCRIPTION OF THE DRAWINGS

The following detailed description, given by way of example, will best be understood in conjunction with the accompanying drawings in which:

FIGS. 7A-7C are useful in understanding the manner in which a line interval of video information is represented by sub-blocks of digitized samples;

FIG. 8 is a diagrammatic representation of a field memory storing a matrix of sub-blocks for a particular channel;

FIGS. 16A-16N are timing diagrams which are useful in understanding the operation of the present invention;

DESCRIPTION OF PREFERRED EMBODIMENTS

Figure 3:
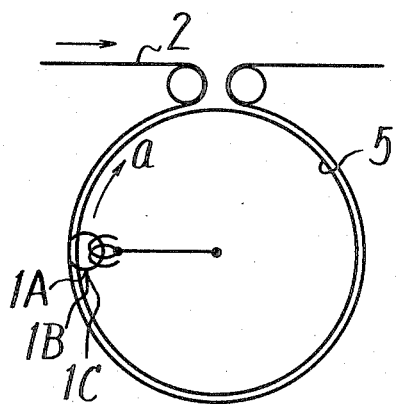
FIG. 3 is a schematic representation of the rotary heads which are used to record and reproduce digital video signals.
Figure 4:
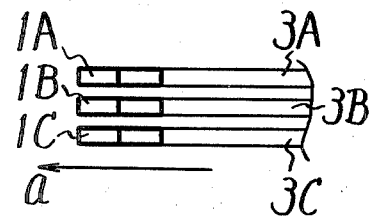
FIG. 4 is a schematic representation of, for example, three heads which reproduce digital video signals from three channels.

The present invention will hereinafter be described in conjunction with a digital VTR. However, it should be understood that this invention can be used with other recording media, such as magnetic discs or sheets, optical discs, and the like. In the digital VTR, an analog signal is converted to a digital video signal, processed by the apparatus shown in FIG. 1, and is recorded by a rotary head assembly (FIG. 3) on a magnetic tape 2 in parallel skewed tracks extending obliquely on the magnetic tape with the resultant configuration shown in FIG. 5. Since the transmitting bit rate of the digital video signal is high, a plurality of heads, such as three rotary heads 1A, 1B and 1C (FIG. 4), are disposed in close proximity to each other, and the digital video signals of one field are distributed through three channels A, B and C to such heads and recorded on the magnetic tape in three parallel tracks 3A, 3B and 3C. An audio signal may also be converted to a PCM (pulse code modulated) signal and recorded by a rotary head (not shown) in another track (not shown) extending parallel to the video tracks 3A, 3B and 3C. Alternatively, the audio signal may be recorded in a track 4 (FIG. 5) extending along a longitudinal edge of the tape.

Rotary heads 1A, 1B and 1C are mounted on a rotary guide drum 5 and are in alignment with the axis of the drum, such as in vertical alignment with each other. The recording tracks 3A, 3B and 3C thus are formed simultaneously with each rotation of drum 5 as the heads scan across magnetic tape 2 which is wrapped helically about the drum to define an angular range of about 340°. If this apparatus is intended to record NTSC composite color television signals, drum 5 rotates at a rate of 60 Hz (60 rotation per second) to record one field interval in the triad of tracks 3A, 3B and 3C with each rotation. As will be described, each track contains a portion (e.g. one-third) of the video information of one field.

Figure 1:
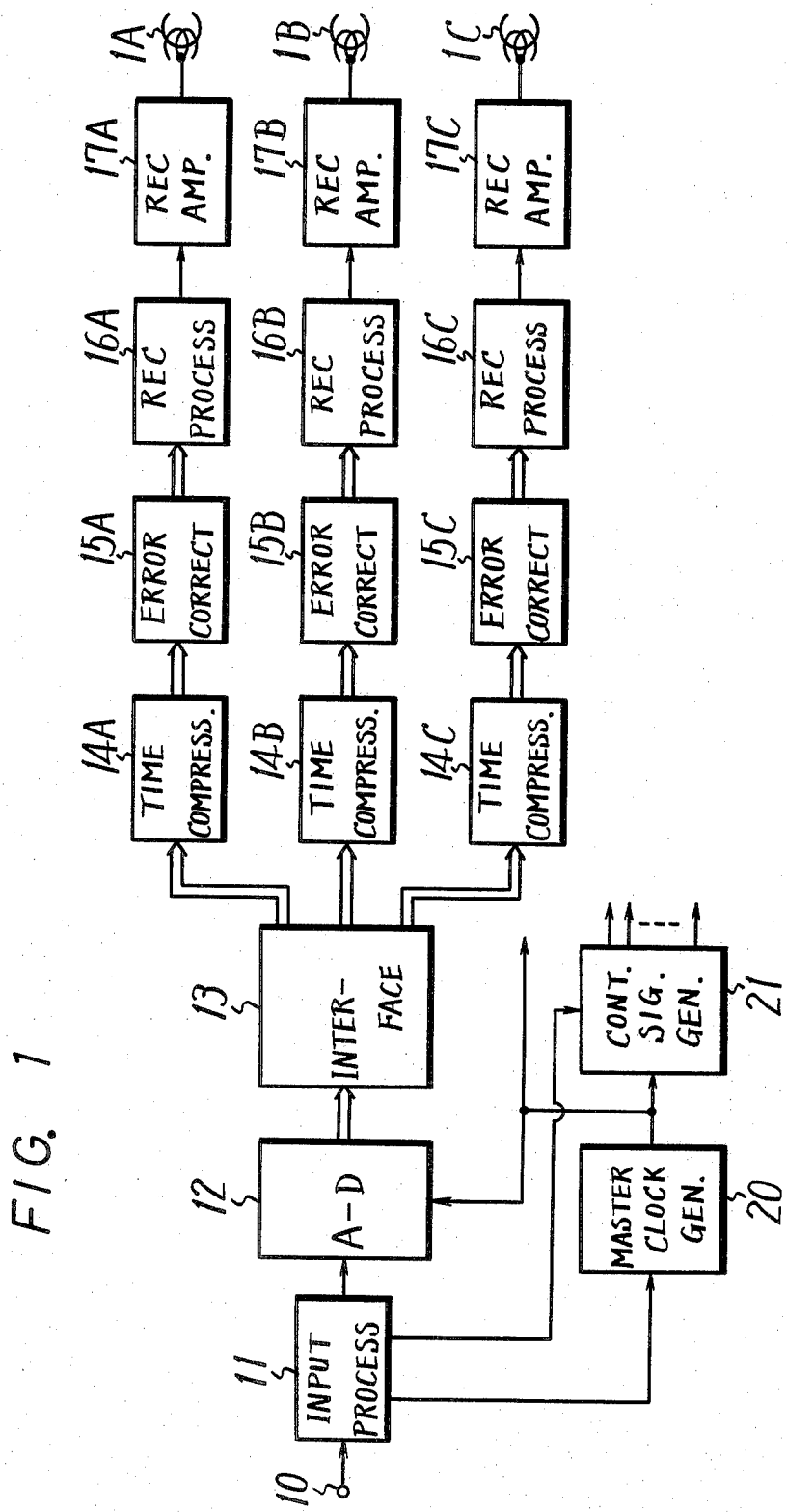
FIG. 1 is a block diagram of one embodiment of a recording section of a digital VTR which functions to record a field interval of video information in separate channels.

Referring now to FIG. 1, one embodiment of a recording section is illustrated, whereby a color video signal to be recorded is applied through an input terminal 10 to an input processor 11. Input processor 11 may comprise a clamp circuit and a synchronizing and burst signal separator to separate the useful picture information, referred to as the effective or video information portion of the color video signal, from the synchronizing and burst signals. The video information portion is supplied to an analog-to-digital (A/D) converter circuit 12; and the synchronizing and burst signals are supplied to a master clock generator 20 which, advantageously, includes a phase locked loop (PLL). The master clock generator generates master clock pulses of a suitable sampling frequency fs which, for example, is equal to $4f_{SC}$, where $f_{SC}$ is the color subcarrier frequency of 3.58 MHz. The clock pulses from generator 20 and separated horizontal and vertical synchronizing signals are applied to a control signal generator 21 which produces various timing pulses that are used in the recording section of the digital VTR.

A/D converter 12 includes a sample-and-hold circuit, supplied with the master clock pulses for sampling the analog video signal, and a converter for converting each sampled analog level to an 8-bit word which is supplied, parallel-by-bit, to an interface 13. The digitized samples, that is, the digital representation of the effective video region of the color video signal, is distributed by interface 13 into three channels A, B and C. The data corresponding to the successive samples of each line are assigned cyclically to the three channels in a repeating order, and the data of the three channels are processed in the same manner. For example, samples 1, 2, 3, 4, 5 ... are distributed to channels A, B and C as $1_A, 2_B, 3_C, 4_A, 5_B...$, where each subscript identifies the channel of that sample. An external digital video signal Din (not shown), for example, from an editing apparatus, may also be supplied to interface 13 to be suitably divided into these three channels. If desired a lesser or greater number of channels may be used.

The data in one of the channels is processed to be a recording signal for head 1A by a time base compression circuit 14A, an error correcting encoder 15A, a recording processor 16A and a recording amplifier 17A. The data in each of the other channels is also processed by the same arrangement, that is, by a time base compression circuit 14B, 14C, an error control encoder 15B, 15C, a recording processor 16B, 16C, and a recording amplifier 17B, 17C, to provide recording signals for heads 1B and 1C, respectively.

For an NTSC color video signal, the duration or period of one line interval (1H) is 63.5 μs, which line interval contains a blanking period therein of 11.1 μs. Accordingly, the effective video region or portion is 52.4 μs. If, as mentioned above, the sampling frequency employed in A/D converter 12 is $4f_{SC}$, in which $f_{SC}=455/2.f_H$ ($f_H$ being the horizontal or line frequency), then the number of samples in each horizontal period H is 910, as indicated in FIG. 7A. However, the number of samples in the effective video region of each line is 750, that is, $52.4/63.5 \times 910 = 750$. It is convenient to assign 250 samples to each of channels A, B, C for each line, each channel thus containing samples of one-third of a line of video information.

In the NTSC system, the number of lines forming one field is 262.5, with the vertical synchronizing period and the equalizing pulse period accounting for 10.5 lines. Some of the lines in the vertical blanking period may contain test signals VIT and VIR which provide useful information. Hence, these lines are also regarded as effective video lines. Thus, the total number of effective video lines in one field period, that is, the total number of lines that must be recorded without loss of useful information is 252. For example, in an odd field, lines 12 to 263 are recorded and in an even field, lines 274 to 525 are recorded.

The code arrangement of each of the recording signals respectively supplied to heads 1A, 1B and 1C will now be described with reference to FIGS. 7B and 7C. As there shown, the data of one line or horizontal period of the color video signal, which comprises 250 samples per channel as previously mentioned, are divided into two, that is, this data is distributed to two sub-blocks for each channel, with 125 samples of data for each sub-block. Each sub-block of the coded digital signal may contain 134 words (1072 bits) in which a block synchronizing signal (SYNC) of three words (24 bits), an identifying (ID) and address (AD) signal of two words (16 bits), the information data of 125 words (1000 bits) and a CRC (Cyclic Redundancy Check) code of four words (32 bits) are arranged one after another. The block synchronizing signal SYNC is used for identifying the beginning of a sub-block, whereupon the identifying and address signals, the information data and/or CRC code can be extracted. The identifying signals ID indicate the channel (track A, B or C), the frame (odd or even), the field (odd or even) and the line (odd or even) to which the information data of the sub-block belongs, and the address signal AD represents the address of the respective sub-block, that is, the relative location of that sub-block in a field of sub-blocks for that channel. The CRC code is used for the detection of an error in the information data of the respective sub-block during a reproducing operation.

FIG. 8 represents the code arrangement for one field in one channel, and the sub-blocks in that channel may be stored in a field memory device (such as a random access memory, or RAM) in this arrangement. In FIG. 8, each reference character SBi (i=1 to 572) indicates one sub-block, with two sub-blocks making up one block or that portion of a line which is distributed to one channel. Since the effective video region of one field is comprised of 252 lines, as mentioned previously, the data of 252 blocks (504 sub-blocks) exist in one field per channel. The video information data of a particular field are sequentially arranged in a 21×12 matrix form having 21 rows and 12 columns, each column being constituted by two sub-block columns. Parity data are also provided in connection with the horizontal and vertical directions, respectively, of the video information data in the matrix. More particularly, in FIG. 8, the parity data for the horizontal direction (referred to as a horizontal, or H-, parity) is shown positioned in the thirteenth column of blocks, and the parity data for the vertical direction (referred to as vertical, or V-, parity) is positioned in the twenty-second row at the bottom of the matrix. In the thirteenth column of blocks at the twenty-second row is disposed the horizontal parity data for the vertical parity data. The horizontal parity data is obtained by deriving the H-parity data for the odd sub-blocks in a row and by deriving the H-parity data for the even sub-blocks in that row. In the first row, for example, parity data $SB_{25}$ is formed by modulo 2 addition:

$$[SB_1] \oplus [SB_3] \oplus [SB_5] \oplus \ldots \oplus [SB_{23}] = [SB_{25}]$$

In the above, [SBi] means only the data in the respective sub-block SBi. In this case, samples belonging to respective ones of the 12 sub-blocks are summed in modulo 2 addition in parallel, 8-bit form. Similarly, parity data $SB_{26}$ is formed by modulo 2 addition:

$$[SB_2] \oplus [SB_4] \oplus [SB_6] \oplus \ldots \oplus [SB_{24}] = [SB_{26}].$$

The H-parity data is similarly obtained for each of the second to twenty-second rows of the matrix. During reproduction, the error correcting ability is enhanced by the fact that parity data is not formed merely by modulo 2 addition of the data of the 24 sub-blocks included in a row, but is formed by the data of 12 sub-blocks positioned at intervals (odd and even) in the row.

The vertical parity data is obtained by modulo 2 addition of the 21 sub-blocks in each of the first to twelve columns of blocks. In the first column, parity data $[SB_{547}]$ is formed by modulo 2 addition:

$$[SB_1] \oplus [SB_{27}] \oplus [SB_{53}] \oplus \ldots [SB_{521}] = [SB_{547}]$$

In this case, samples belonging to respective ones of the 21 sub-blocks are summed in modulo 2 addition in parallel 8-bit form.

Accordingly, each sub-block of parity data ($SB_{25}$, $SB_{26}$, ... $SB_{547}$, $SB_{548}$ ...) comprise 125 samples and are similar to the sub-blocks of video data ($SB_1$, $SB_2$, ... $SB_{544}$).

The digital video signals of one field constituted by the matrix arrangement (22×13) shown in FIG. 8, is recorded by a respective one of heads 1A, 1B, 1C as a series of first, second, third, ... twenty-second rows in sequence. Since 13 blocks are to be recorded in an interval normally occupied by twelve lines (12H), a period of 12×22=264H is needed for transmitting the digital signals of one field. If the VTR is of the C-format type, and thus employs an auxiliary head for recording and reproducing one part of the vertical blanking period in one field, then a duration of only about 250H can be recorded with a video head. Therefore, the period of 264H of data in each channel to be recorded is time-base-compressed )with a compression ratio Rt of 41/44) to a period of duration of 246H by time base compressors 14A, 14B and 14C, respectively. This leaves a margin of several line intervals to be recorded in each track. In addition to time-compressing the video data, each of the time base compressors provides a data blanking period in which the block synchronizing signal SYNC, the identifying and address signals ID and AD, and the CRC code are inserted for each sub-block of video data of 125 samples. Each time base compressor also establishes data blanking periods in which the blocks of the H- and V-parity data are inserted. The H- and V-parity data and the CRC code for each sub-block are generated by the respective error correcting encoders 15A, 15B and 15C for channels A, B and C. The block synchronizing signal SYNC and the identifying and address signals ID and AD are added to the video data in respective recording processors 16A, 16B and 16C. Further, the recording processors preferably include encoders of the block coding type which convert each 8-bit sample to a 10-bit sample, and parallel-to-serial converters for serializing the parallel 10-bit samples. As disclosed in detail in U.S. patent application Ser. No. 171,481 dated July 23, 1980 and having a common assignee herewith, block coding advantageously converts each 8-bit word to code words whose DC levels are close to zero. By selecting certain 10-bit words to have one-to-one correspondence to the original 8-bit words, the number of "0"s and "1"s in each 10-bit word may be substantially equal and run lengths can be reduced as much as possible. Such block coding is employed for preventing degradation of the waveform during reproduction, and thus, a substantially DC-free digital signal is recorded. This avoids recording a signal whose DC components are needed for signal interpretation because, as is known, DC components are not reproduced by magnetic recording/playback devices. The 10-bit words are serialized by recording processors 16A, 16B, 16C and, moreover, a preamble code is inserted before the first digital signal in the field and a post-script code is added following the last digital signal.

Figure 5:
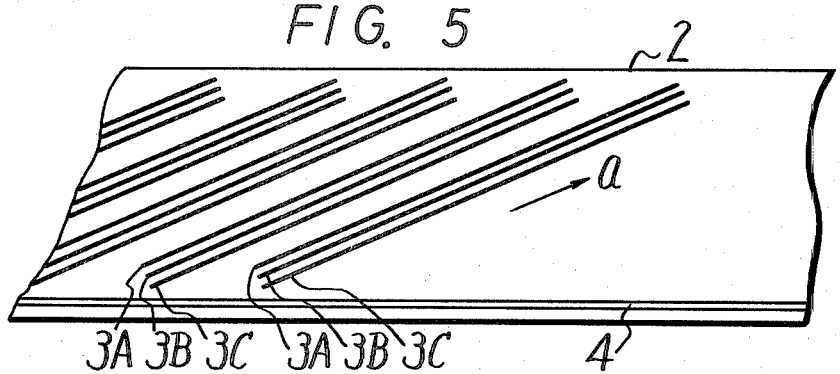
FIG. 5 is a schematic representation of three channels, or tracks, in which digital video signals are recorded on a magnetic tape.

The serialized digital signals are amplified by recording amplifiers 17A, 17B and 17C and recorded in respective tracks, or channels, by recording transducers 1A, 1B and 1C, with the resultant recording configuration shown in FIG. 5. Preferably, the widths of tracks 3A, 3B and 3C and the spacing therebetween are such that each triad of tracks corresponds to one video track of the SMPTE type "C" format. In accordance with this format, longitudinal track 4 contains control pulses CTL derived from the video vertical synchronizing signal. These control pulses are used in the usual servo control arrangement at the reproducing section of the VTR.

Figure 2:
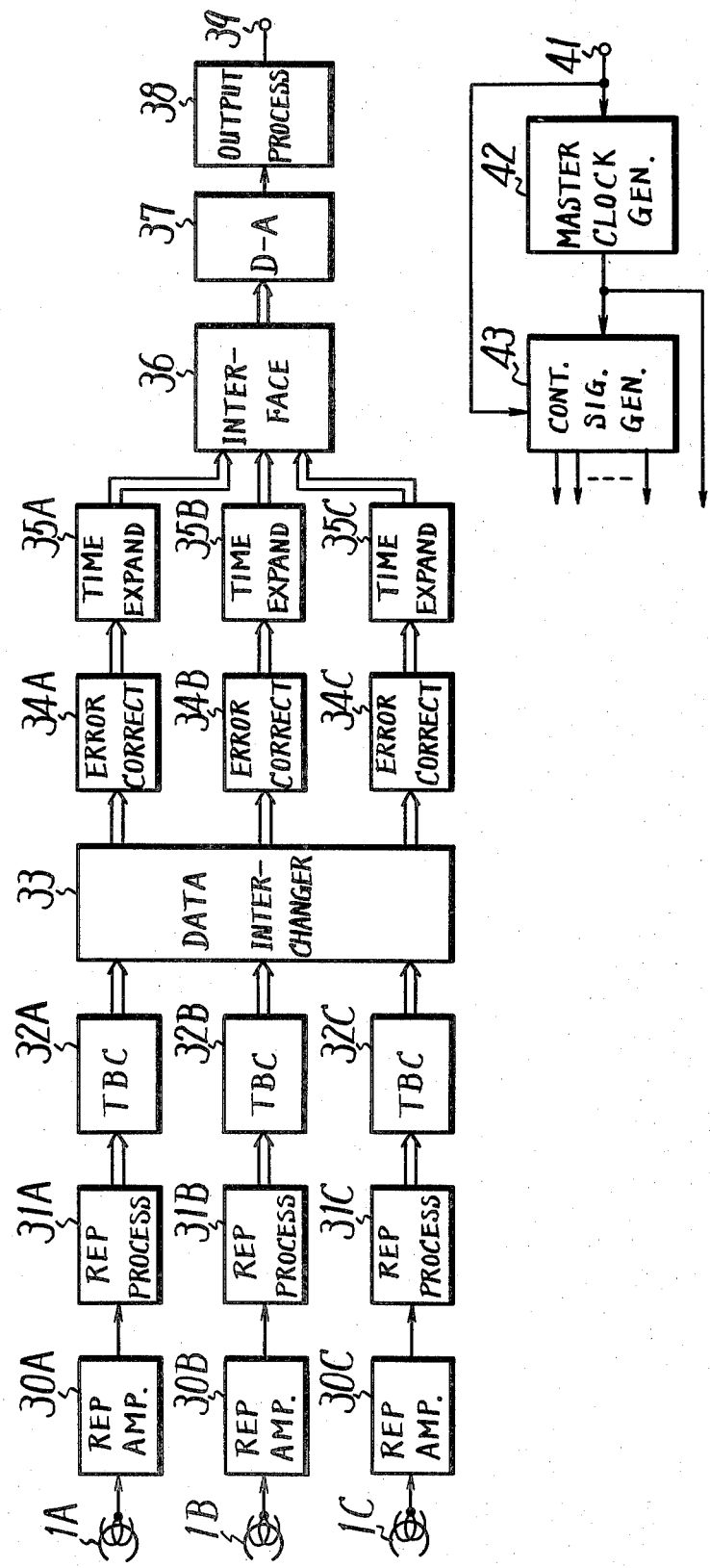
FIG. 2 is a block diagram of a reproducing section of a digital VTR which is compatible with the recording section shown in FIG. 1 and in which the present invention finds ready application.
Figure 6:
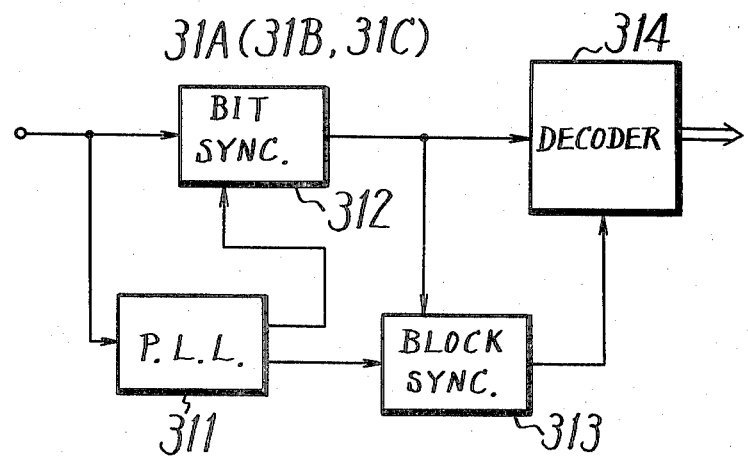
FIG. 6 is a block diagram of a portion of the reproducing processor used in the reproducing section shown in FIG. 2.

In the reproducing or playback section of the digital VTR with which this invention is advantageously applied, three channels of reproduced signals (A, B and C) are derived from heads 1A, 1B and 1C which scan tracks 3A, 3B and 3C, respectively, corresponding to such channels. As shown in FIG. 2, the reproduced signals are applied from heads 1A, 1B and 1C through reproducing amplifiers 30A, 30B and 30C to respective reproducing processors 31A, 31B and 31C. Each reproducing processor includes a bit synchronizing circuit of the type shown in FIG. 6. The serialized bits, reproduced from each channel by heads 1A, 1B and 1C and amplified by reproducing amplifiers 30A, 30B and 30C, respectively, are supplied to a phase-locked loop (PLL) circuit 311. The PLL circuit generates a clock signal synchronized with the received bits, and supplies this clock signal to a bit synchronizing circuit 312 which times, or clocks, the reproduced digital signals with this clock signal. The timed digital signals then are supplied to a block synchronizer 312 whereat the block synchronizing signal SYNC is detected and extracted, thus indicating the beginning of each reproduced sub-block. A decoder 314 receives the timed digital signals from bit synchronizing circuit 312 and also receives the extracted block synchronizing signal SYNC for converting each serialized 10-bit word to a parallel-by-bit word. The thus converted digital signals also are subjected to block decoding, whereby a corresponding 8-bit parallel word is produced in correspondence with the reproduced 10-bit word. The resulting 8-bit digital signals are applied to respective time base correctors (TBC's) 32A, 32B and 32C in which any time base error is removed from the data in the corresponding channel. Each of the time base correctors is provided with, for example, four buffer memories, in which reproduced sub-blocks are sequentially written by clock pulses derived from PLL circuit 311, and the sub-blocks are sequentially read out from the buffer memories, by reference clock pulses generated by a reference synchronizing pulse generator. When the reading operation is likely to get ahead of the writing operation, the memory from which the data has just been read is read again. This re-reading of data is referred to herein as "old data". Data which is read out from the memory for the first time is referred to herein as "latest data".

The data of each channel is provided from the respective TBC's 32A, 32B and 32C to error correcting decoders 34A, 34B and 34C, respectively, in which an error occurring in the information data is corrected or compensated. Each error correcting decoder includes a field memory in which all of the sub-blocks of one field in a respective channel are stored in the configuration shown in FIG. 8. Each sub-block is written into an addressable location of the field memory in accordance with its address signal AD.

Corrected data in each channel is supplied to a respective time base expander circuit 35A, 35B and 35C, respectively, which returns the data in that channel to the original transmitting rate and format; and then this data is coupled to a common interface circuit 36. The interface circuit serves to return the reproduced data of the three channels into a single channel, and this single channel of digital signals is applied to a digital-to-analog (D/A) converter circuit 37 for conversion of the data into analog form. The output from the D/A converter circuit is applied to an output processor 38 which adds the usual synchronizing and burst signals thereto to reproduce a color video signal at output terminal 39.

An external reference signal is supplied by the reference synchronizing pulse generator (not shown) via a terminal 41 to a master clock generator 42, from which clock pulses and the reference synchronizing pulses are provided to a control signal generator 43. The control signal generator generates control signals which are synchronized with the reference pulses, such as various timing pulses, identifying signals for the line, field and frame, and sample clock pulses. In the reproducing section, the processing of the signals from heads 1A, 1B and 1C to the inputs of time base correctors 32A, 32B and 32C is timed by a clock pulse extracted from the reproduced data, such as produced by PLL circuit 311, whereas the processing of the signals from the outputs of the time base correctors to output terminal 39 is timed by the clock pulse from master clock generator 42.

Figure 9:
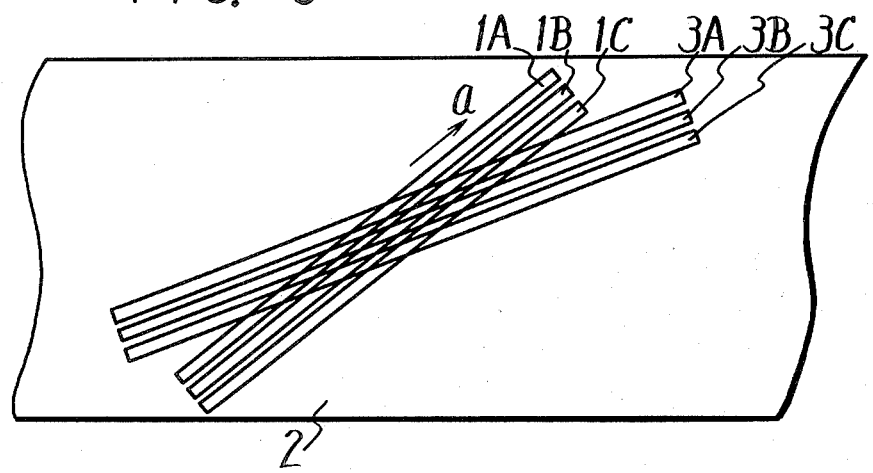
FIG. 9 represents the manner in which the playback heads scan different tracks during a special reproducing mode of the digital VTR.

Referring to FIG. 9, it may be appreciated that, during a normal reproducing mode, heads 1A, 1B and 1C scan traces which coincide with tracks 3A, 3B and 3C, respectively, which had been recorded previously on tape 2. The usual tracking servo control circuitry (not shown) operates to insure this proper tracking of each track by its correct head. Thus, data of channels A, B and C, recorded in tracks 3A, 3B and 3C, are reproduced by heads 1A, 1B and 1C. Each head scans only its associated track so as not to reproduce data of different channels. However, during special reproducing modes, such as slow-motion, quick search, still or reverse modes, heads 1A, 1B and 1C may exhibit the scanning traces shown in the direction of arrow a in FIG. 9. That is, each head traverses the triad of tracks 3A, 3B and 3C so as to reproduce data of its own channel as well as data of different channels. Hence, head 1A is seen to traverse tracks 3A, 3B and 3C so as to reproduce data of channels A, B and C. Similarly, each of heads 1B and 1C also reproduces data from different channels. Consequently, TBC 32A, for example, may be supplied with sub-blocks from channel A, followed by sub-blocks from channel B, followed by sub-blocks from channel C, all reproduced by head 1A. If data interchanger 33 is omitted, such sub-blocks from channels A, B and C will be supplied to the field memory included in error correcting decoder 34A, thereby resulting in significant interference and degradation of the video information in channel A. Similar degradation obtains for the video information in channels B and C and, as a consequence thereof, the recorded video information cannot be recovered. The video picture which ultimately is reproduced from this information will appear largely as interference and noise. Accordingly, it is one aspect of the present invention to provide data interchanger 33 so as to avoid this difficulty. It may be appreciated that, during a normal reproducing mode, data interchanger 33 is not needed. However, for special reproducing modes, the data interchanger functions to direct channel A data to error correcting decoder 34A, to direct channel B data to error correcting decoder 34B and to direct channel C data to error correcting decoder 34C, regardless of the particular playback head which reproduces that data. Hence, even if head 1B reproduces channel A data when it traverses track 3A, data interchanger 33 nevertheless directs this channel A data, which will be supplied to the data interchanger by TBC 32B, to error correcting decoder 34A.

Figure 10:
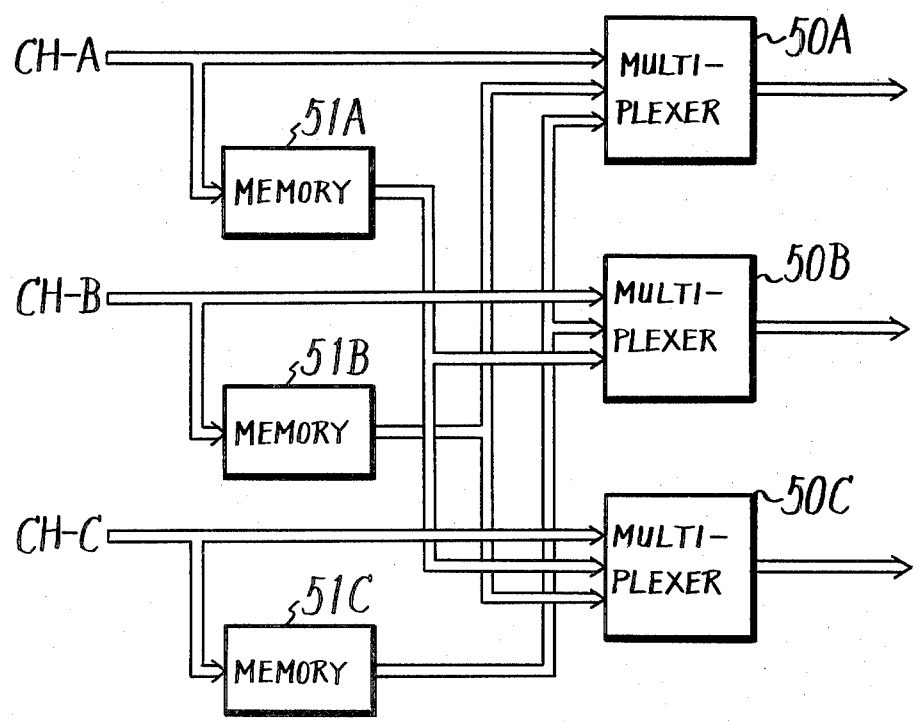
FIG. 10 is a block diagram of one embodiment of the present invention.

A block diagram of data interchanger 33 is illustrated in FIG. 10, and includes a plurality of multiplexers 50A, 50B and 50C, each associated with a respective channel A, B and C, and buffer memories 51A, 51B and 51C, also associated with channels A, B and C, respectively. Each multiplexer includes three sets of inputs, each set being associated with a respective channel. One set of these inputs is connected directly to its associated TBC, and the other two sets are connected to the outputs of the buffer memories which are associated with the other channels. Thus, one set of inputs of multiplexer 50A is coupled to TBC 32A to receive data supplied by this TBC, regardless of the particular channel of that data, another set of inputs coupled to the outputs of buffer memory 51B so as to receive data which has been reproduced by head 1B and supplied through TBC 32B, and a third set of inputs coupled to the outputs of buffer memory 51C so as to receive data which has been reproduced by head 1C. Buffer memory 51A is associated with channel A and is adapted to receive data reproduced by head 1A. The outputs of buffer memory 51A are coupled to respective inputs of multiplexers 50B and 50C. It is noted that the output of this buffer memory is not coupled to multiplexer 50A. Similarly, buffer memories 51B and 51C are connected to receive data which has been reproduced by heads 1B and 1C, respectively; and the outputs of buffer memory 51B are coupled to multiplexers 50A and 50C, while the outputs of buffer memory 51C are coupled to multiplexers 50A and 50B.

As will be explained below, multiplexer control circuitry is provided such that each multiplexer selects one set of inputs thereto to be coupled to its output only if the data which is supplied to the selected set of inputs is associated with the same channel as the multiplexer. For example, let it be assumed that the digital VTR is operating in its special reproducing mode and, more particularly, that the sub-blocks read out of TBCs 32A, 32B and 32C have been reproduced by heads 1A, 1B and 1C, respectively, but are associated with channels B, C and A, respectively. Thus, TBC 32A supplies multiplexer 50A with a sub-block from channel B; TBC 32B supplies multiplexer 50B with a sub-block from channel C and TBC 32C supplies multiplexer 50C with a sub-block from channel A. These respective sub-blocks also are written into buffer memories 51A, 51B and 51C, respectively. Hence, memory 51A functions to supply the third set of inputs of multiplexer 50B with a sub-block from channel B, and also supplies the second set of inputs of multiplexer 50C with this sub-block. Likewise, buffer memory 51B supplies the second set of inputs of multiplexer 50A with a sub-block from channel C and also supplies the third set of inputs of multiplexer 50C with this channel C sub-block. Finally, buffer memory 51C supplies the third set of inputs of multiplexer 50A with a sub-block from channel A and also supplies the second set of inputs of multiplexer 50B with this channel A sub-block. The multiplexer control circuitry activates multiplexer 50A to select its third set of inputs, multiplexer 50B is activated to select its third set of inputs, and multiplexer 50C likewise is activated to select its third set of inputs. Hence, even though data from different channels have been reproduced by heads 1A, 1B and 1C, nevertheless, the correct data is supplied to the respective channel outputs of these multiplexers. That is, multiplexer 50A transmits a channel A sub-block, multiplexer 50B transmits a channel B sub-block and multiplexer 50C transmits a channel C sub-block.

It may be appreciated that each multiplexer may be provided with the same number of sets of inputs as there are channels. Also, each multiplexer may be constructed as a suitably controlled switching circuit. Also, buffer memories 51A, 51B and 51C, which may have a storage capacity of at least one sub-block, may be controlled to have a sub-block written therein only if that sub-block is from a different channel. For example, a sub-block from channel B or channel C may be written into buffer memory 51A; a sub-block from channel A or channel C may be written into buffer memory 51B; and a sub-block from channel A or channel B may be written into buffer memory 51C.

As will be described below, data identification signals NDT and ORDY are used to control the input selection of the respective multiplexers. More particularly, for multiplexer 50A, data identification signals NDTa, ORDYba and ORDYca control the particular selection of the first, second or third sets of inputs. More particularly, this input selection is made in accordance with the following table:

| CONTROL TABLE FOR MULTIPLEXER 50A | | | | |
|---|---|---|---|---|
| CONDITION | NDTa | ORDYba | ORDYca | SELECTION |
| ① | 0 | 0 | 0 | TBC 32A |
| ② | 0 | 0 | 1 | MEMORY 51C |
| ③ | 0 | 1 | 0 | MEMORY 51B |
| ④ | 0 | 1 | 1 | MEMORY 51B (MEMORY 51C) |
| ⑤ | 1 | 0 | 0 | TBC 32A |
| ⑥ | 1 | 0 | 1 | TBC 32A |
| ⑦ | 1 | 1 | 0 | TBC 32A |
| ⑧ | 1 | 1 | 1 | TBC 32A (MEMORY 51B) (MEMORY 51C) |

Those selections indicated in parentheses for conditions ④ and ⑧ represent alternative selections which can be made; but the preferred selections are those which are not within parentheses.

Buffer memories 51A, 51B and 51C preferably are of the so-called first-in first-out (FIFO) type storage devices, such as shift registers, recirculating memory stacks, and the like.

Data identification signals NDTa, ORDYba and ORDYca have the following significance:

NDTa="1": This represents that the sub-block supplied by TBC 32A is the "latest data" in channel A.

NDTa="0": This represents that the sub-block supplied from TBC 32A either is "old data" from channel A, or is the latest data from another channel (e.g. channel B or channel C).

ORDYba="1": This represents that buffer memory 51B has the latest channel A sub-block stored therein.

ORDYba="0": This represents that buffer memory 51B has an old channel A sub-block stored therein (that is, this channel A sub-block stored in buffer memory 51B is a re-read sub-block).

ORDYca="1": This represents that buffer memory 51C has the latest channel A sub-block stored therein.

ORDYca="0": This represents that buffer memory 51C has an old channel A sub-block stored therein.

In the foregoing, the expressions "latest data" and "old data" have the same meanings set out hereinabove, that is, the latest data refers to a sub-block which is read out from the TBC memory for the first time, and old data refers to the sub-block which has been re-read from the TBC memory.

In the foregoing table, when data identification signals NDTa, ORDYba and ORDYca are [000], multiplexer 50A selects the sub-block supplied thereto by TBC 32A. This selection is made merely to simplify the multiplexer controls. If desired, multiplexers 50A may, alternatively, select the sub-block supplied thereto by buffer 51B or by buffer 51C. The manner in which these data identification signals are generated is described in greater detail below.

It is appreciated that the sub-blocks which are selectively transmitted by each of multiplexers 50A, 50B and 50C are supplied to error correcting decoders 34A, 34B and 34C, respectively, whereat each such sub-block is written into the field memory thereat, which field memory may be represented schematically as the matrix shown in FIG. 8. Thus, the sub-block which is associated with the proper channel is written into the appropriate field memory. More particularly, and as mentioned above, each sub-block is written into the particular storage location in its associated field memory in accordance with its address signal AD. However, the sub-blocks which are reproduced from the magnetic tape during special reproducing modes are not error-corrected in error correcting decoders 34A, 34B and 34C, even though such sub-blocks are written into their respective field memories, because the H-parity, V-parity codes are effective to detect errors only during the normal reproducing mode. Furthermore, each field memory is of the type wherein a sub-block which is written into a storage location remains therein until it is replaced, or over-written, by another sub-block. Hence, if a new sub-block is not written into a particular storage location of the field memory, the sub-block which had been written therein previously remains stored at that location.

Thus, it is appreciated that data interchanger 33 operates to distribute the digital video signals which are reproduced from various channels by heads 1A, 1B and 1C to the proper field memories, from which they subsequently can be read out, regardless of the particular head which is used to reproduce that signal. Consequently, a suitable video picture can be reproduced from these distributed digital video signals, even during special reproducing modes.

Figure 11:
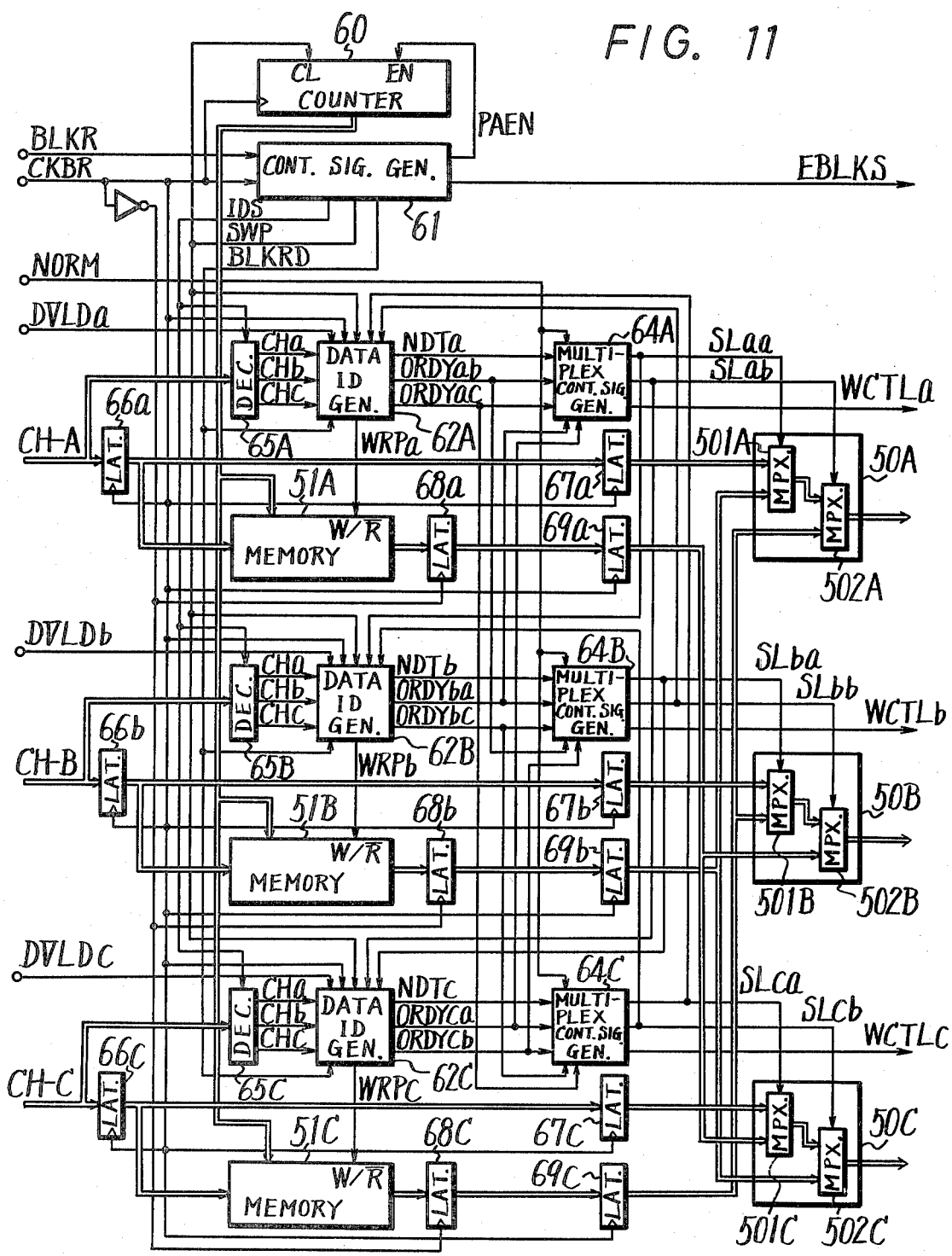
FIG. 11 is a block diagram showing one embodiment of the present invention in greater detail.

Data interchanger 33 is shown in greater detail in FIG. 11, which is comprised of an address counter 60, a control signal generator 61, data identification signal generators 62A, 62B and 62C associated with respective channels A, B and C, multiplex control signal generators 64A, 64B and 64C, channel identification decoders 65A, 65B and 65C, which circuits function to control multiplexers 50A, 50B and 50C as well as buffer memories 51A, 51B and 51C. FIG. 11 also illustrates various latch circuits 66(a, b and c), 67(a, b and c), 68(a, b and c) and 69(a, b and c) which are provided to adjust the timing relationships for the various data signals.

In the embodiment shown in FIG. 11, the data signals which comprise the respective sub-blocks are written into and read out from buffer memories 51A, 51B and 51C in a time-sharing manner during each cycle of read clock pulses CKBR, these clock pulses being derived from the reference synchronizing pulse generator. That is, during a portion of one half cycle of the read clock pulses, data is written into the buffer memories, and during the remainder of the clock pulse cycle, data is read out therefrom. Also, once a sub-block is read out of a buffer memory 51A, 51B, 51C, it is not read once again. Rather, it is replaced by the next sub-block supplied thereto by TBC 32A, 32B, 32C. Furthermore, once a sub-block is supplied from the TBC, the preceding sub-block then stored in the buffer memory is overwritten by the new sub-block, even if this previously stored sub-block had not been used.

For the condition shown in the foregoing table wherein the data identification signals NDTa, ORDYba and ORDYca are [000], the sub-block read out from TBC 32A is selected by multiplexer 50A. However, it is recognized that this sub-block either is an "old" (i.e. re-read) sub-block or is a sub-block from channel B or channel C. It is preferred that, for this condition, the sub-block supplied from TBC 32A is not written into the field memory of error correcting decoder 34A. Accordingly, when this condition is present for either of the remaining multiplexers, the sub-block supplied thereto from either TBC 32B or TBC 32C is not written into the field memory of error-correcting decoder 34B or 34C, respectively.

As shown in FIG. 11, each multiplexer, for example multiplexer 50A, is comprised of a pair of 2-input multiplexers, such as multiplexers 501A and 502A. The use of these two 2-input multiplexers, in combination, facilitates 3-input operation. Each multiplexer 501A, 502A is supplied with selection signals SLaa and SLab, respectively. When the selection signal supplied to the respective multiplexer is a binary "0", this multiplexer selects the data supplied to the upper input thereto. However, when the selection signal is a binary "1", the lower input is selected. From FIG. 11, it is seen that the upper input of multiplexer 501A is supplied with data that is read from TBC 32A, and the lower input thereof is supplied with data derived from TBC 32B and stored in buffer memory 51B. The upper input of multiplexer 502A is coupled to the output of multiplexer 501A, and the lower input thereof is supplied with data derived from TBC 32C and stored in buffer memory 51C. Accordingly, the following selections are made when selection signals SLaa and SLab exhibit the indicated conditions:

[00]: Data derived from TBC 32A is selected.
[01]: Data derived from TBC 32C is selected.
[10]: Data derived from TBC 32B is selected.
[11]: Data derived from TBC 32C is selected.

Similar operations obtain for the control over multiplexers 50B and 50C.

Address counter 60 is supplied with clock pulses CKBR which may appear as shown in FIG. 16A. This counter is enabled to count these clock pulses by an enable signal PAEN (FIG. 16F) which is synchronized with the "data" and CRC portion of each sub-block that is read out of the respective time base correctors. The count of address counter 60 is used as an address for each buffer memory 51A, 51B and 51C to select the particular storage locations therein into which the data words included in each sub-block are stored.

Figure 12:
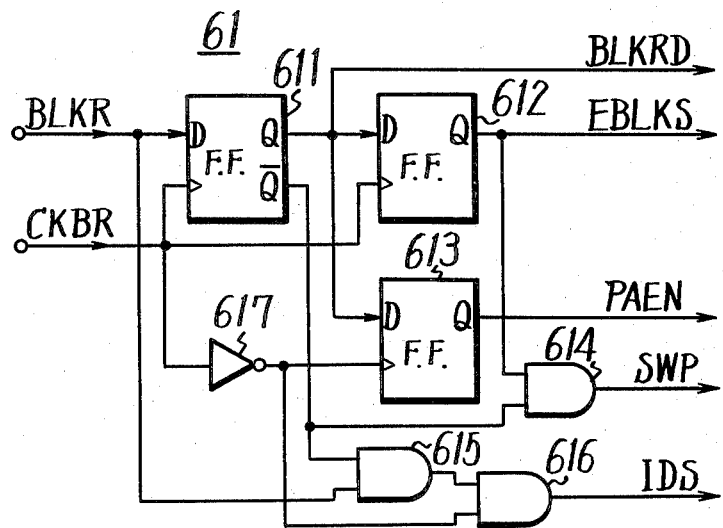
FIG. 12 is a logic diagram of a control signal generator which can be used with the embodiment of FIG. 11.
Figure 13:
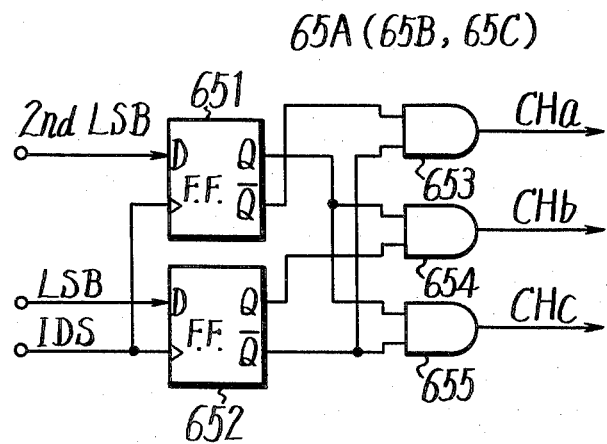
FIG. 13 is a logic diagram of a channel decoder which can be used in the embodiment of FIG. 11.

Control signal generator 61, which is shown in greater detail in FIG. 12, is supplied with a sub-block signal BLKR, whose duration is equal to that of one sub-block, and which is generated by control signal generator 43 (FIG. 2), and also is supplied with the clock pulses CKBR. The control signal generator generates the aforementioned enable signal PAEN, as well as a delayed sub-block signal BLKRD, an identification select signal IDS and a memory access control signal SWP, all of these signals being illustrated in FIGS. 16D, 16E and 16H, respectively. Identification signal IDS is supplied to each of decoders 65A, 65B and 65C which detect the channel identification signal ID of each sub-block that is read out from the respective time base correctors. One embodiment of a typical decoder is shown in FIG. 13, which generates a binary "1" as the signal CHa, CHb or CHc if the received sub-block is detected as being from channel A, channel B or channel C, respectively. Thus, regardless of the particular head which reproduces this sub-block, the correct channel of that data is detected and supplied to the data identification signal generator.

Figure 14:
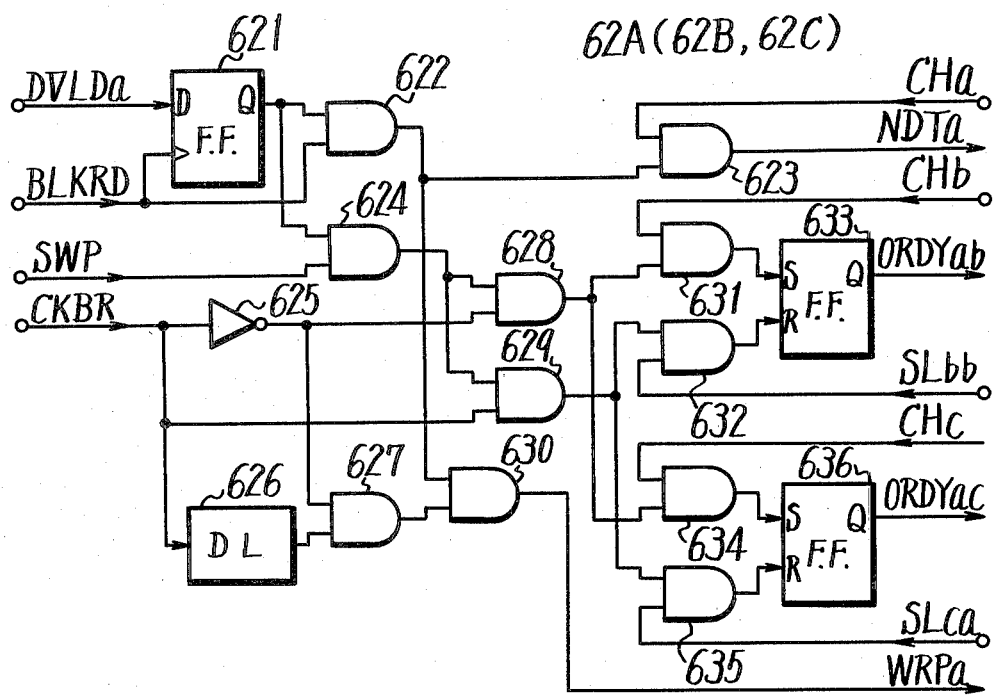
FIG. 14 is a logic diagram of a data identification generator which can be used in the embodiment of FIG. 11.

One embodiment of a data identification signal generator which can be used in the data interchanger, such as data identification signal generator 62A, is shown in greater detail in FIG. 14. The data identification signal generator is supplied with the channel indicating signals CHa, CHb and CHc produced by decoder 65A, and also with delayed sub-block signal BLKRD and with a signal DVLDa produced by time base corrector 32A, this latter signal indicating whether the sub-block read out from the time base corrector is the latest data or is old data. The manner in which signal DVLDa is generated is described below with respect to FIG. 19. It will suffice merely to note that this signal is a binary "1" when the latest sub-block is read out from TBC 32A, and is a binary "0" when old data is read out, that is, when the sub-block is re-read from the time base corrector. Data identification signal generator 62A also is supplied with clock pulses CKBR and with memory access signal SWP. Still further, multiplex selection signal SLbb, supplied to multiplexer 50B and multiplex selection signal SLca, supplied to multiplexer 50C, also are applied to data identification signal generator 62A.

The data identification signal generator produces data identification signals NDTa, ORDYab and ORDYac in response to the various signals supplied thereto. As mentioned above, data identification signal NDTa is a binary "1" to represent that the sub-block supplied by TBC 32A is the latest data in channel A. This data identification signal NDTa is produced if signal DVLDa is a binary "1" and if decoder 65A supplies channel identification signal CHa to the data identification signal generator. If the sub-block supplied by TBC 32A is the latest data in channel B, then the signal DVLDa will be a binary "1", and channel identification signal CHb also will be a binary "1". In response to these conditions, the data identification signal ORDYab is produced as a binary "1", representing that the sub-block which is received from TBC 32A is channel B data. This signal ORDYab is utilized by multiplex control signal generator 64B to produce the selection signal SLbb, thereby activating multiplexer 502B to select its lower input and, thus, transmit this channel B sub-block, which had been written into buffer memory 51A. Similarly, if the sub-block supplied by TBC 32A is the latest data in channel C, then signal DVLDa is a binary "1" and channel identification signal CHc also is a binary "1". Data identification signal generator 62A responds to these signals to produce the data identification signal ORDYac, which represents that this sub-block is channel C data and should be transmitted by multiplexer 50C. This signal ORDYac is utilized by multiplex control signal generator 64C to generate selection signal SLca as a binary "1", whereby multiplexer 501C selects its lower input, and selection signal SLcb is produced as a binary "0" such that multiplexer 502C selects its upper input. Hence, under the control of data identification signal ORDYac, the channel C sub-block, which was written into buffer memory 51A, is transmitted by multiplexer 50C. The sub-blocks which are transmitted by the respective multiplexers have the timing relationship illustrated in FIG. 16J.

The data identification signal generators also generate write pulses, such as write pulses WRPa, shown in FIG. 16N. These write pulses WRPa are supplied to the write/read controls of the buffer memories, such as memory 51A, to control the write-in operation of the sub-block which is received from, for example, TBC 32A. It will be seen, from the description set out below, that, once a sub-block is stored in memory 51A, it may be selectively transmitted by multiplexer 50B or 50C, depending upon the channel of this sub-block.

Figure 15:
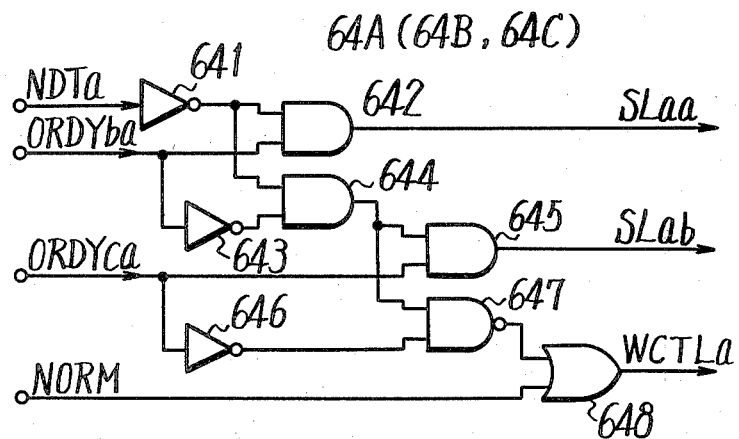
FIG. 15 is a logic diagram of a multiplex control signal generator which can be used in the embodiment of FIG. 11.

Multiplex control signal generators 64A, 64B and 64C may have the configuration illustrated in FIG. 15. Multiplex control signal generator 64A, for example, generates multiplex selection signals SLaa and SLab in accordance with the following table.

TABLE II

| NDTa | ORDYba | ORDYca | SLaa | SLab |
|------|--------|--------|------|------|
| 0 | 0 | 0 | 0 | 0 |
| 0 | 0 | 1 | 0 | 1 |
| 0 | 1 | 0 | 1 | 0 |
| 0 | 1 | 1 | 1 | 0 |
| 1 | 0 | 0 | 0 | 0 |
| 1 | 0 | 1 | 0 | 0 |
| 1 | 1 | 0 | 0 | 0 |
| 1 | 1 | 1 | 0 | 0 |

It is seen that the foregoing table corresponds to the aforementioned control table for multiplexer 50A. It is appreciated that data identification signals ORDYba and ODRYca are supplied to multiplex control signal generator 64A by data identification signal generators 62B and 62C, respectively.

Multiplex control signal generators 64B and 64C function in a manner similar to that described above for multiplex control signal generator 64A.

Each multiplex control signal generator also produces a write control signal WCTL which is supplied to the field memory in a respective one of error correcting decoders 34A, 34B and 34C to control the write-in operation of that field memory. This field memory write control signal is generated by multiplex control signal generator 64A, for example, when any of the data identification signals NDTa, ORDYba and ORDYca is a binary "1".

Thus, it is seen that the data interchanger functions to transmit the sub-blocks of channels A, B and C to the proper ones of error correcting decoders 34A, 34B and 34C, depending upon the detected channel identification signal included in each sub-block. Regardless of the particular playback head which reproduces that sub-block, it nevertheless is supplied to the proper error correcting decoder.

Preferred embodiments of control signal generator 61, decoder 65, data identification signal generator 62 and multiplex control signal generator 64 now will be described with reference to FIGS. 12-15, respectively.

Control signal generator 61 is supplied with a sub-block signal BLKR, whose duration is equal to that of one sub-block SB and which is supplied from, for example, control signal generator 43 (FIG. 2), to generate control signals BLKRD, EBLKS, PAEN, SWP, and IDS in synchronism with clock pulses CKBR. The control signal generator, as shown in FIG. 12, is comprised of, for example, three D-type flip-flop circuits 611, 612 and 613, three AND gates 614, 615 and 616, and an inverter 617. The operation of control signal generator 61 will best be understood by referring to FIG. 16.

A data signal which constitutes one sub-block is shown in FIG. 16C. This data signal is synchronized with the clock pulse CKBR shown in FIG. 16A. Sub-block signal BLKR (FIG. 16B), whose duration corresponds to the data signal, is fed to D-type flip-flop circuit 611 at its data terminal D whereat it is delayed for one clock period so as to produce the delayed sub-block signal BLKRD (FIG. 16D). This signal BLKRD is fed to D-type flip-flop circuit 612 where it is further delayed by one clock period, resulting in the signal EBLKS (FIG. 16G). The delayed sub-block signal BLKRD also is fed to the data terminal D of flip-flop circuit 613 where it is further delayed by one-half of the clock period to produce the signal PAEN (FIG. 16F). The signal SWP (FIG. 16H) is obtained from AND gate 614 ($\overline{BLKRD} \cdot EBLKS$) and is used to indicate that access to memory 51 has been accomplished. The signal IDS (FIG. 16E) is obtained from AND gate 616 during the negative half cycle of clock pulse CKBR when ($BLKR \cdot \overline{BLKRD}$), and is used for extracting the channel ID signal from the sub-block shown in FIG. 16C.

Channel ID decoders 65A, 65B and 65C of FIG. 11 are each comprised of, as shown in FIG. 13, D-type flip-flop circuits 651 and 652, and three AND gates 653, 654 and 655. The least significant bit LSB and second LSB of the ID signal included in the sub-block of FIG. 16C, which, it is recalled, is formed of successive parallel-bit data signals, are respectively stored in flip-flop circuits 652 and 651 in response to the signal IDS produced by control signal generator 61. The outputs of the flip-flop circuits are supplied to AND gates 653 to 655 to derive therefrom channel ID signals, CHa, CHb and CHc, respectively.

The data identification signal generators 62A, 62B and 62C of FIG. 11 are each constructed as shown in FIG. 14. Signals DVLD are supplied to the respective data identification signal generators when TBCs 32A, 32B and 32C read out the latest data signals in the respective channels. More particularly, signal DVLD is a binary "1", when the latest sub-block data is read from from a respective one of the TBCs 32A to 32C, and signal DVLD is a binary "0" when old data is read out once again. In data identification signal generator 62A, the signal DVLDa supplied from TBC 32A is latched by a D-type flip-flop circuit 621 in response to the delayed sub-block signal BLKRD from control signal generator 61. The output of flip-flop circuit 621 is gated by the signal BLKR in AND gate 622, and then fed to an AND gate 623 to produce data identification signal NDTa if it is in coincidence with a binary "1" channel ID signal CHa produced by channel ID decoder 65A (discussed above). This data identification signal NDTa applied to multiplex control signal generator 64A.

In multiplex control signal generator 64A, as shown in FIG. 15, the data identification signal NDTa is supplied through an inverter 641 to an AND gate 642. This AND gate 642 also is supplied with a signal ORDYba from data identification signal generator 62B, provided in channel B, to produce a selection signal SLaa. The output of inverter 641 also is gated with the inverted version of signal ORDYba, obtained through inverter 643, in AND gate 644. The output of AND gate 644 is gated in an AND gate 645 with a signal ORDYca, obtained from data identification signal generator 62C in channel C, thereby to produce selection signal SLab. These two selection signals, SLaa and SLab, are supplied respectively to two multiplexers 501A and 502A included in multiplexer 50A (FIG. 11). In each of multiplexers 501A and 502A, when the respective selection signal is a binary "0", the data provided at its upper inputs (as shown in FIG. 11) is selected.

Returning to FIG. 14, when the signals DVLDa and CHa are both binary "1"s, it is recognized that the output data from TBC 32A is the latest data of channel A and, hence, the signal NDTa is produced as a binary "1". When signal NDTa is a "1", selection signals SLaa and SLab are always binary "0"s, and as can be seen from FIG. 11, the output of TBC 32A is supplied through multiplexers 501 and 502 in FIG. 11 directly to the field memory included in error correcting decoder 34A (FIG. 2). Accordingly, data is written into this field memory at a predetermined position in accordance with the address signal AD of the read out sub-block.

In the foregoing description, it has been assumed that magnetic head 1A picks up the signal that had been recorded in track 3A. If the output of TBC 32A is assumed to be the latest data of channel B, the signals DVLDa and CHb both will be binary "1"s. At this time, memory 51A, which executes reading and writing cycles alternately at every half cycle of clock pulse CKBR, will have this latest channel B data stored therein. Inverter 625, delay circuit 626 and AND gate 627 cooperate as a write clock generator to supply delayed, inverted pulses CKBR to AND gate 630, whereat such pulses are gated with the output of AND gate 622 to produce a signal WRPa which, in turn, is coupled to memory 51a. The output of delay circuit 626, which provides less than one half cycle delay, is shown in FIG. 16M and the write clock pulses produced by AND gate 627 are shown in FIG. 16N. A flip-flop circuit 633, such as an R-S flip-flop device, is set by the timing pulse provided by AND gates 624 and 628 to generate the signal ORDYab as a binary "1".

Similarly, if the output of the TBC 32A is assumed to be the latest data of channel C, the signals DVLDa and CHc both will be binary "1"s, resulting in the setting of a flip-flop circuit 636. The selection between flip-flop circuits 633 and 636 is carried out by AND gates 631 and 634 under the control of channel ID signals CHb and CHc. These flip-flop circuits 633 and 636 are respectively reset in response to a timing pulse derived from AND gate 629. The timing of the setting and resetting of flip-flop circuits 633 and 636 is shown in FIGS. 16K (setting) and 16L (resetting). More particularly, reset signals are produced by AND gates 632 and 635 in response to the timing pulse derived from AND gate 629 when respective ones of the selection signals SLbb and SLca are binary "1".

In multiplex control signal generator 64A (FIG. 15), which has been partially described hereinabove, an inverter 646 and a NAND gate 647 are used to produce a write control signal WCTLa for the field memory. A signal NORM, which indicates that the VTR is in its normal reproducing mode when a binary "1" and indicates that special reproducing mode has been selected when a binary "0", is supplied from the mode control circuitry of the VTR (not shown) to an OR gate 648 to derive therefrom the field memory write control signal WCTLa. It is appreciated that, when the signal NORM is "1", the write control signal WCTLa always is "1", and a write command to the field memory is generated. When the special reproducing mode has been selected, the signal WCTLa is "1" when the signal NDTa is "1", when the signal ORDYba is "1", or when the signal ORDYca is "1" to command the writing of data into the field memory of channel A. After a sub-block is stored in the field memory, the respective one of the signals NDTa, ORDYba and ORDYca is reset to "0" so as to reset the signal WCTLa and inhibit the writing operation for the field memory of channel A.

The selection signals are generated according to the following logic equations:

$SLaa = \overline{NDTa} \cdot ORDYba$
$SLab = \overline{NDTa} \cdot \overline{ORDYba} \cdot ORDYca$
$SLba = \overline{NDTb} \cdot ORDYcb$
$SLbb = \overline{NDTb} \cdot \overline{ORDYcb} \cdot ORDYab$
$SLca = \overline{NDTc} \cdot ORDYac$
$SLcb = \overline{NDTc} \cdot \overline{ORDYac} \cdot ORDYbc$ The digital data transmitted by each multiplexer 50 is represented in FIG. 16J. As is apparent, the transmitted digital data is delayed from the input data, that is, the data read out by the TBC by two CKBR clock cycles. In the embodiment shown in FIG. 11, latch circuits 66 and 69 are provided for each channel in order to adjust and synchronize the time relationship of this digital data.

Figure 17:
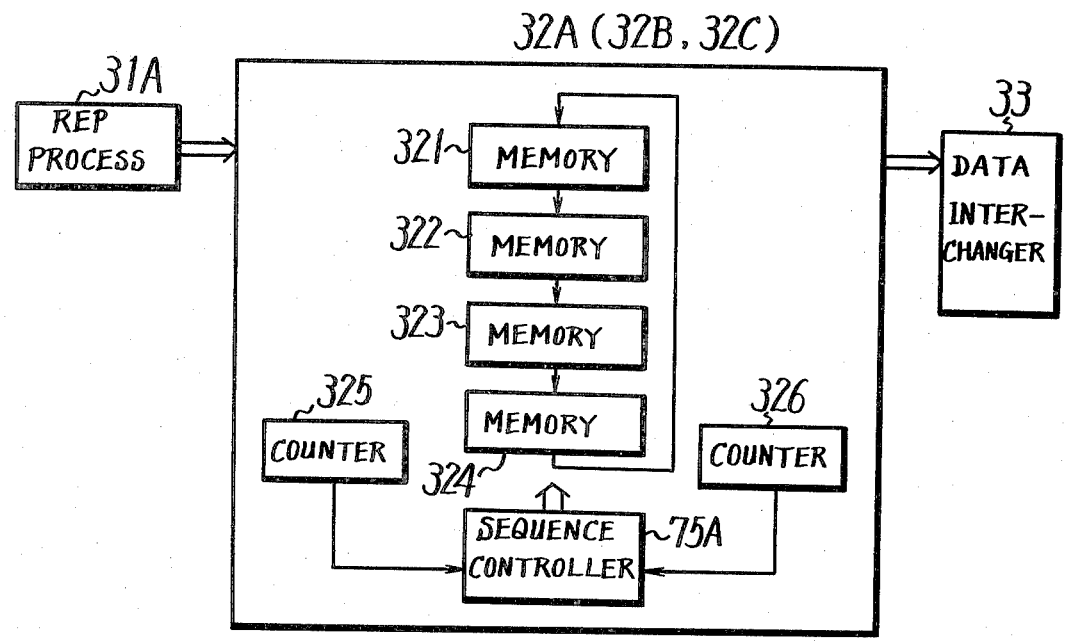
FIG. 17 is a block diagram of a time base corrector which can be used in the reproducing section of a digital VTR.

A block diagram of each time base corrector TBC 32A (32B, 32C) for each channel A (B, C) is shown in FIG. 17. TBC 32A, for example, has four buffer memories 321 to 324, a write-in address counter 325, a read-out address counter 326, and a sequence controller 75A. Each of memories 321 to 324 has a memory capacity sufficient to store a plurality of sub-blocks.

When a write-in operation is executed, a digital signal reproduced from the VTR, exclusive of its block synchronizing signal SYNC, is sequentially written into memory 321 under the control of a write clock which is synchronized with this reproduced digital signal. Also, counter 325 is incremented to keep account of the number of digital signals which have been stored. When memory 321 is filled, as determined by the count of counter 325, the write-in operation is changed over to memory 322. Then, when memory 322 is filled, the write-in operation is further changed over to memory 323 and then to memory 324. Thus, signals are sequentially written into memories 321 to 324 in a cyclical manner.

The read-out operation is carried out in a manner substantially similar to the write-in operation, whereby the contents of buffer memories 321 to 324 are sequentially read out. This read-out operation is executed under the control of a constant, stable clock produced by the reference synchronizing pulse generator. To avoid designating the same memory for simultaneously writing in and reading out data, which may occur because of the independent write and read clock rates, a two-memory offset is provided so that when, for example, memory 323 is selected for a write-in operation, the read-out operation is carried out by memory 321. Thus, jitter for ±1 memory capacity can be absorbed.

During the normal reproducing mode, the write-in and read-out speeds exhibit the same average values, so that one memory will not have data simultaneously written therein and read out therefrom. However, during a special reproducing mode, such as fast search, the write-in process sometimes is overtaken or outstripped by the read-out process. Consequently, when one memory has completed its read-out operation, and at the same time the next-following memory still is carrying out its write-in operation, the read-out operation is performed once again by that one memory. The data which is first read out from this one memory is the aforenoted "latest data", and the signal DVLD is "1" when this latest data is read out. The data which is read out once again from this one memory is the aforenoted "old data", and the signal DVLD is "0" when this old data is read out.

Figure 18:
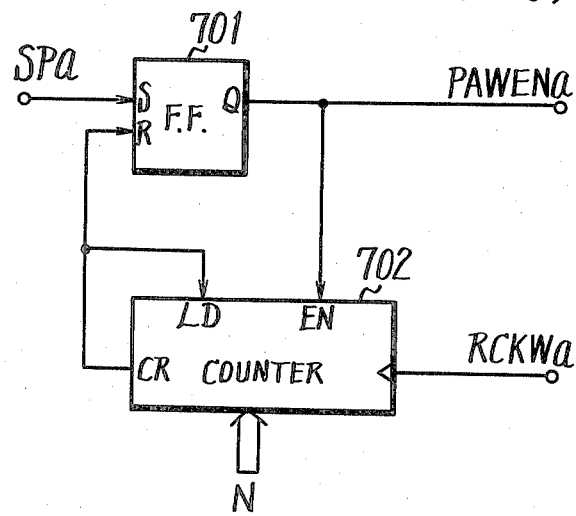
FIG. 18 is a block diagram of a data flag generator which is used with the time base corrector.

A logic diagram of each data flag generator 70A (70B, 70C) which is included in TBC 32A (32B, 32C) and which produces a flag signal PAWENa (PAWENb, PAWENc) to indicate the positions of the signals ID and AD, data and CRC code contained in the sub-block SB, is illustrated in FIG. 18. The first bit of signals ID and AD is identified as SPa (SPb, SPc), and is detected at the reproducing processor 31A. The detection of this first bit SPa sets a flip-flop circuit 701 to set the flag PAWENa as a binary "1" and also to supply a binary "1" enable signal to the enable input EN of a counter 702. This counter thus is enabled to count clock pulses RCKWa, which are derived from the phase-locked loop PLL 311 in reproducing processor 31A shown in FIG. 6.

It is recalled that data is processed by the reproducing processor, time base corrector, data interchanger, and the like, in 8-bit parallel form. Counter 702 is adapted to be decremented from a count of N, whereby ⅛ of the number of bits in the block synchronizing signal SYNC is subtracted from ⅛ of the number of bits in one sub-block, resulting in a carry output CR to reset flip-flop circuit 708 and to reset the flag PAWENa to a "0". This carry output also loads the constant N into the counter 702 to await the next sub-block. Hence, the flag signal PAWENa is a binary "1" during the period that the signals ID and AD, data and CRC code are present, so that these signals can be detected, and is a binary "0" during the period of block synchronizing signal SYNC.

Figure 19:
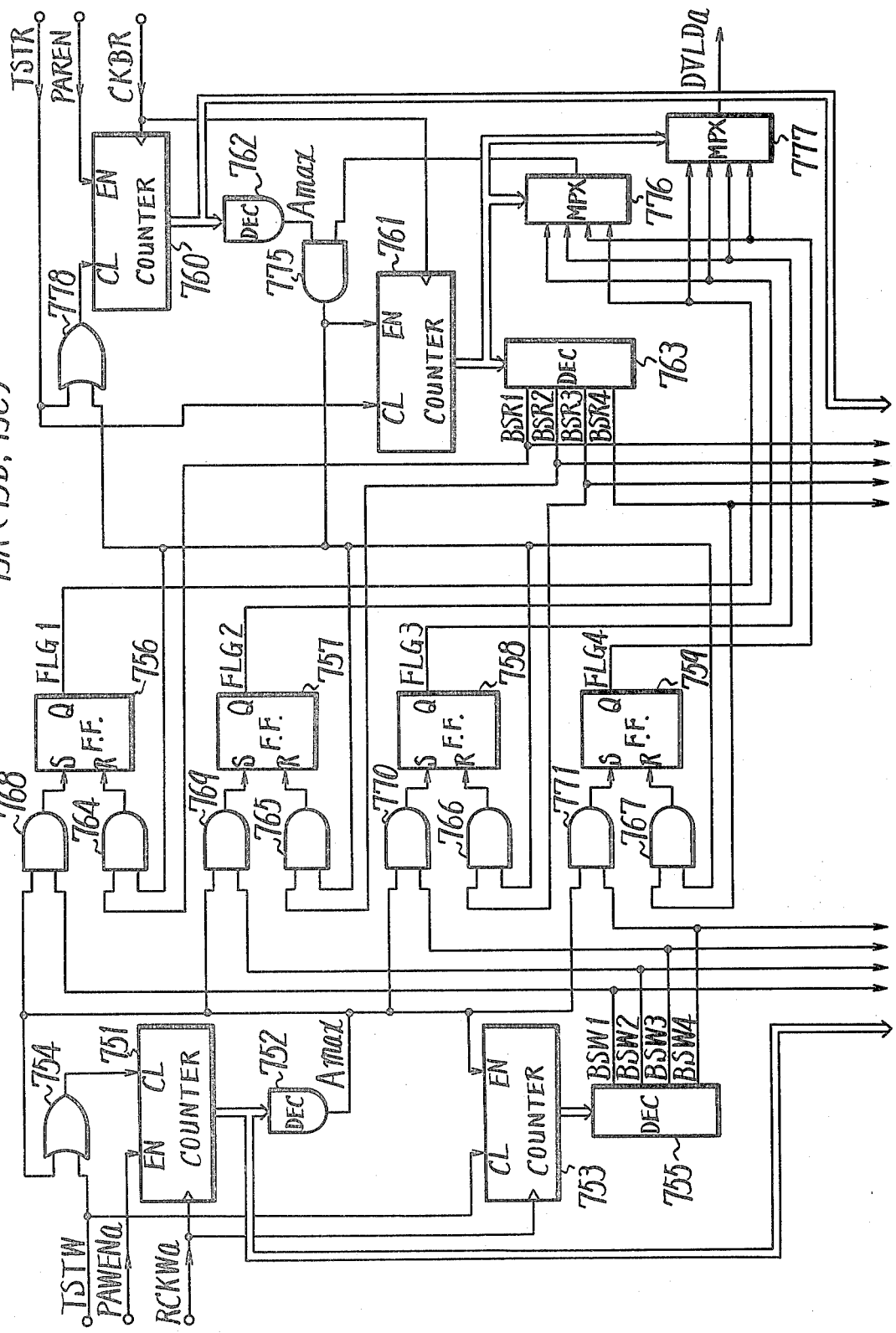
FIG. 19 is a logic diagram of one embodiment of a sequence controller which can be used with the time base corrector.

FIG. 19 illustrates one embodiment of the circuit construction of sequence controller 75A (75B, 75C) of TBC 32A (32B, 32C) for producing control signals for memories 321 to 324, and for producing the signal DVLDa (DVLDb, DVLDc). To carry out a write-in operation, a pulse TSTW, which is positioned at the beginning of the playback of each field interval, is derived from a pulse generator which indicates the rotary phase of each of rotary heads 1A to 1C. It may be appreciated by those of ordinary skill in the VTR art that this pulse generator is used in the tracking servo arrangement. Pulse TSTW clears a counter 751, and then the signal PAWENa, which is supplied to the enable input of this counter, becomes a binary "1" to enable clock pulses RCKWa to be counted.

Once counter 751 reaches the capacity of one buffer memory, the count is decoded by a decoder 752 to produce an output signal Amax, which is a binary "1", to enable a memory select counter 753 to count one pulse RCKWa and thereby increment its count value by one. The output Amax of decoder 752 also is supplied through an OR gate 754 to clear counter 751 so that this counter is prepared to count the pulses RCKWa again. Thus, it is seen that counter 753 is cleared by pulse TSTW at the beginning of each reproduced field, and then the count thereof is incremented each time that counter 751 reaches the count corresponding to the capacity of a buffer memory. As counter 753 is incremented, its count is decoded by a decoder 755 to produce memory select signals BSW1 to BSW4, which are binary "1"s, sequentially. These select signals select the respective one of memories 321 to 324 into which data is written, and also the contents of counter 751 are used as address signals for the memories to select the particular storage locations into which the data words which constitute the sub-blocks are written. Pulses RCKWa are used as the write clock pulses for the memories.

Thus, the signals ID and AD, data and CRC code are written into each memory. When the write-in operation of a memory (such as memory 321) is completed, the output of decoder 752 is a binary "1" (Amax="1") and combines with the then-present output of decoder 755 (such as output BSW1) to set one of flip-flop circuits 756 to 759, which corresponds to this memory (such as flip-flop circuit 756) via a respective one of AND gates 768 to 771 (such as AND gate 768) so that the flag signal associated with that memory (such as flag signal FLG1) is set to a binary "1".

Concurrently with the write-in operation, a read-out operation is performed. A signal TSTR, which is similar to but delayed from the signal TSTW by a time corresponding to the storage capacity of two memories, is generated to clear a read address counter 760. Counter 760 is supplied with an enable signal PAREN, similar to the enable signal PAWENa used in the write-in operation and which will be described later in detail, at its enable input and also with the stable, constant clock pulses CKBR produced by the reference synchronizing pulse generator. It may be appreciated that counter 760, together with decoder 762, counter 761 and decoder 763, cooperate in substantially the same manner as counters 751 and 753 and decoders 752 and 755. In other words, every time that counter 760 counts a number of clock pulses CKBR equal to the capacity of one buffer memory, the count value of a memory select counter 761 is incremented by one, to produce sequential memmory select signals BSR1 to BSR4 at decoder 763. These memory select signals BSR1 to BSR4 select the respective ones of memories 321 to 324 from which data is read, and also the contents of counter 760 are used as address signals to read-out the particular words which constitute the stored sub-blocks. Clock pulses CKBR are used as the memory read clock. Accordingly, the contents of the memories are sequentially read out; and also the time base of the read out signal is stabilized by constant clock pulses CKBR.

When the read-out operation of a particular memory is completed, the output of decoder 763 corresponding to that memory and the output of decoder 762 representing the end of the read-out operation are supplied through AND gates 764 to 767 to the reset inputs of flip-flop circuits 756 to 759 to reset the flag signal associated with that memory which has just been read out.

The count of counter 761 is supplied to a multiplexer 776 to control that multiplexer to select the flag FLG which is associated with the next memory to be read out. That is, if the count of counter 761 is one, multiplexer 776 transmits flag FLG 2; if the count is two, the multiplexer transmits flag FLG 3, and so on. This transmitted flag FLG conditions AND gate 775 to couple the signal Amax (produced by decoder 762) to the enable input of counter 761, so that when the transmitted flag FLG is "0", that is, the write-in operation of the next memory to be read out is not completed, counter 761 is inhibited from counting. As a result, this next memory is not selected and the memory being read out presently remains selected to be read out again. Hence, old data is read out. The count of counter 761 also is supplied to a multiplexer 777 to control that multiplexer to select the FLG which is associated with the memory then being read out. This flag FLG is used as the signal DVLDa, described above. Counter 760 is cleared either by the signal TSTR or by the gated output of decoder 762, both of these signals being supplied to the clear input CL by OR gate 778.

It is recognized that the output of each of flip-flop circuits 756 to 759 is set (to binary "1") following the completion of a data write-in period, and is reset to "0" when the data read-out operation is completed once. Preferably, each of buffer memories 321 to 324 is a recycle type memory, such as a read/write meory, a shift register, or the like, so that even though data is read out once, the same data is recycled so as to remain in that memory. However, when the contents of that memory are read out a second time, that is, as old data, the output flag of its associated flip-flop circuit now is "0" and, hence, the signal DVLDa also is a "0".

Figure 20:
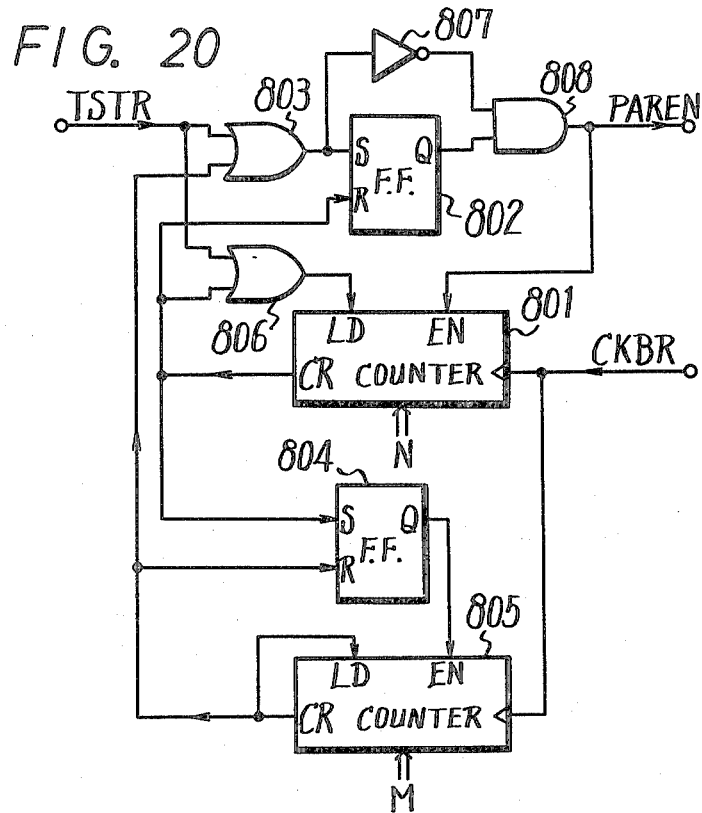
FIG. 20 is a logic diagram of a control signal generator which can be used with the time base corrector.

The write clock RCKW and the read clock CKBR exhibit the same average clock rates. Since only the signals ID and AD, data and CRC code are written into the TBC memories, it is sufficient merely to perform the read-out operation intermittently and only for a time duration corresponding to the length of these signals ID, AD, data and CRC code. The signal PAREN admits of such a time duration, and is produced by a circuit of the type shown in, for example, FIG. 20. In this circuit, a counter 801 and a flip-flop circuit 802 are adapted to operate in a manner similar to that described above with respect to the circuit of FIG. 18. That is, the pulse TSTR sets flip-flop circuit 802 via OR gate 803, so that the signal PAREN becomes a binary "1". This signal PAREN enables counter 801 to count down clock pulses CKBR. When the count of this counter has been decremented by N counts, for example, it has been decremented from a preset count of N to a count of 0, that is, ½ of the total number of bits of the signals ID and AD, data and CRC code have been counted, its carry output CR produces a carry "1" which resets flip-flop circuit 802 so that the signal PAREN is changed over to a "0". Also, this carry signal is supplied by OR gate 806 to the load input LD of counter 801 to load the counter once again with the constant N in preparation for the next counting cycle.

The carry signal produced by counter 801 also is supplied to a flip-flop circuit 804 to set the same, whereby a counter 805 is enabled to count clock pulses CKBR in the downward direction. When the count of this counter is decremented from a preset count of M to a count of 0, or ½ the total number of bits of the block synchronizing signal SYNC, a carry "1" is produced at the carry output CR of counter 805 to reset flip-flop circuit 804, thereby halting further counting and also loading the constant M once again into the counter in preparation for the next counting cycle.

The carry signal produced by counter 805 also is used to set flip-flop circuit 802 and enable counter 801 to commence its count down cycle. Thus, the signal PAREN is a binary "1" for a time duration equal to that of the signals ID and AD, data and CRC code, and is produced periodically at intervals immediately following the block synchronizing signal SYNC.

In the foregoing description, it has been assumed that data interchanger 33 includes buffer meories 51A, 51B, 51C. However, this invention also can be used with a data interchanger that is not provided with such buffer memory. In such an embodiment, data identification signal generator 62A (62B, 62C) shown in FIg. 14, can be simplified to have the configuration 90A (90B, 90C) shown in FIG. 21. When the signal DVLDa from TBC 32A is "1", indicating that the latest data is being read out of the TBC, and the signal CHa is "1", indicating that this latest data has been reproduced from channel A (track 3A), the signal NDTa becomes "1" and the data read out from TBC 32A is written into the field memory included in error correcting decoder 34A. More particularly, the signal DVLDa is supplied by OR gate 904 to flip-flop circuit 903 to be stored therein. This conditions AND gate 905 to gate the signal BLKRD to AND gate 909, which is energized by the channel ID signal CHa to produce the signal NDTa of level "1".

Now, if the signal DVLDa is a binary "1" and the channel ID signal CHb (or CHc) is a binary "1", the signal NDTa becomes a binary "0" but AND gate 910 (or 911) is energized to produce the signal ORDYab (or ORDYac) of level "1". This represents that the output of TBC 32A is the data of channel B (or C) which has been reproduced from track 3B (or 3C). Therefore, if the signal NDTb (or NDTc) is "0" in level, the output data from TBC 32A is written into the field memory of the error correcting decoder 34B (or 34C).

Figure 21:
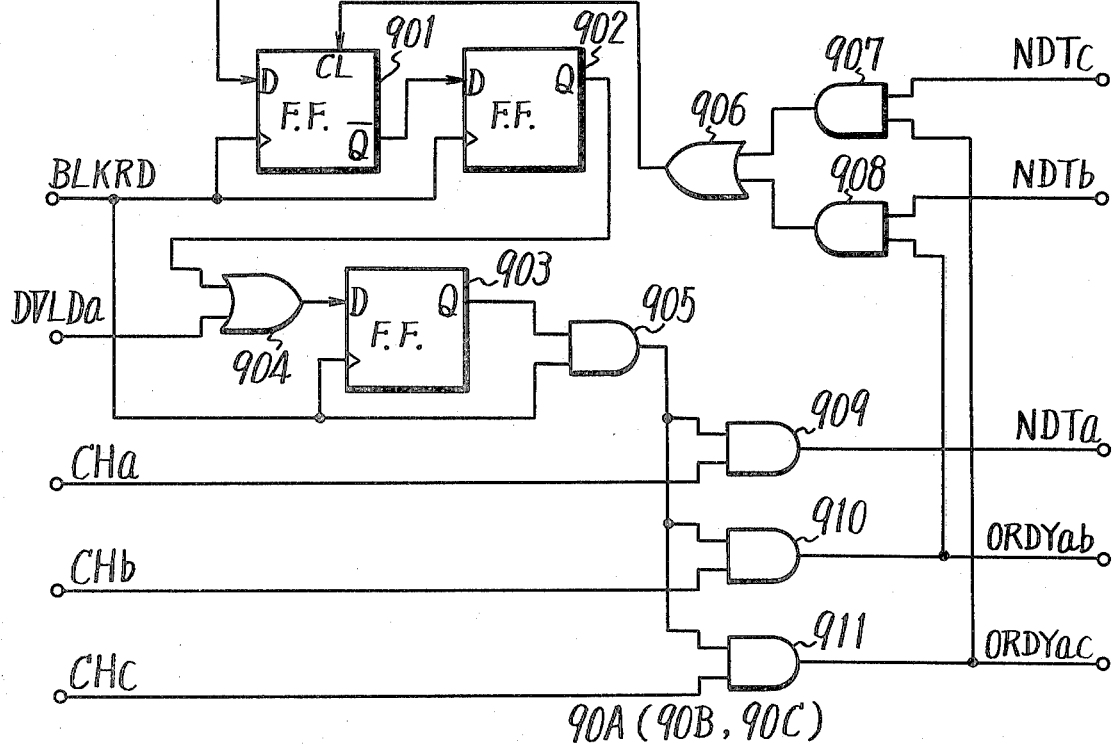
FIG. 21 is a block diagram of another embodiment of the data identification generator which can be used in FIG. 11.

Data identification signal generator 90A shown in FIG. 21 also operates in response to the following special conditions. Let it be assumed that the signal DVLDa is "1", indicating that the latest data is being read out of TBC 32A, and that the signal CHb is "1", indicating that this latest data is channel B data. The signal ORDYab of level "1" thus is obtained, as described above. However, if the signal NDTb, produced by data identification signal generator 90B, also is a binary "1", indicating that the latest data from channel B now is being read out of TBC 32B, the output of TBC 32B, rather than the output of TBC 32A, preferentially is written into the field memory of the error correcting decoder 34B. This means that the output of TBC 32A, even though it is the latest data, will not be used by any of the error correcting decoders. The signal NDTb is supplied by AND gate 908, conditioned by the signal ORDYab, and by OR gate 906 to the clear input of a flip-flop circuit 901 to reset that flip-flop circuit at the beginning of the immediately following delayed sub-block signal BLKRD. The Q output of flip-flop circuit 901 is applied to flip-flop circuit 902 to set the latter at the beginning of the next (i.e. second) signal BLKRD. Flip-flop circuit 903, which had been set in response to the signal DVLDa, remains set for an interval equal to four delayed sub-block signals BLKRD. That is, assuming that each of buffer memories 321, 322, 323 and 324 of TBC 32A has a memory capacity of two sub-blocks, signal DVLDa is a binary "1" for the first two sub-blocks (i.e. the first two delayed sub-block signals BLKRD) and then is a binary "0" for the next two sub-blocks (i.e. the third and fourth sub-block signals BLKRD). During these third and fourth sub-blocks, channel ID signal CHb is a binary "1" but it is assumed that the signal NDTb is a binary "0" because the latest data read out of TBC 32B is not channel B data. But, even though the signal DVLDa is a "0" during the third and fourth sub-blocks, flip-flop circuit 902 maintains flip-flop circuit 903 in its set state such that the old channel B data now read out of the TBC 32A is written into the field memory of error correcting decoder 34B under the control of signal ORDYab.

AND gate 907 is provided for channel C and operates in response to the signal NDTc in a manner similar to that described above for AND gate 908 in response to the signal NDTb.

While the present invention has been particularly shown and described with reference to certain preferred embodiments, it will be readily apparent by those of ordinary skill in the art that various changes and modifications in form and details may be made without departing from the spirit and scope of the invention. For example, the digital samples for each horizontal line interval of the video signal may be distributed to a greater or lesser number of channels. That is, although the foregoing has described three channels (A, B and C), two channels may be used, as desired. Furthermore, the number of sub-blocks which are provided in each channel for each horizontal line interval may be greater than two subblocks. For example, if two channels are used, each channel may contain three sub-blocks of digitized video signals for each horizontal line. Furthermore, although the foregoing has described the recording of one field interval for each pass of recording heads 1A, 1B and 1C, two or more field intervals may be recorded in each such pass. Thus, each track 3A, 3B and 3C may contain digital video signals which relate to two or more fields. Of course, in such an alternative embodiment, each track will contain only a portion of the video information for each field. If two channels are used, each track will contain one-half of the video information of such fields. If three channels are used, each track will contain one-third of the video information of such fields.

It is intended that the appended claims be interpreted as including the foregoing as well as other such changes and modifications.

What is claimed is:

1. Apparatus for use in a digital video signal playback device of the type having a record medium in which identifiable plural channels of digital video signals are recorded thereon in a like plurality of tracks, said apparatus comprising:
    plural transducer means associated with said plural channels for reproducing said digital video signals from said plurality of tracks, each transducer means normally reproducing a respective, predetermined channel of said digital video signals;
    detecting means for identifying the particular channel of the digital video signal reproduced by each of said transducer means; and
    signal interchange means having plural channel outputs and responsive to said detecting means for diverting digital video signals that have been reproduced by transducer means associated with channels different from the channels of the digital video signals reproduced thereby to the proper channel outputs as determined by said detecting means.

2. The apparatus of claim 1 wherein said transducer means comprises at least two playback heads and wherein at least two channels of digital video signals are recorded; and wherein said signal interchange means comprises at least two channel diverting means for diverting a digital video signal of a first channel which has been reproduced by a second playback head to a first channel output, for diverting a digital video signal of a second channel which has been reproduced by a first playback head to a second channel output, and for directing digital video signals of said first and second channels which have been reproduced by said first and second playback heads to said first and second channel outputs, respectively.

3. The apparatus of claim 1 wherein said digital video signals are provided with channel identification codes, and wherein said detecting means comprises plural channel identification decoding means, each coupled to receive the digital video signals which have been reproduced by a predetermined corresponding one of said transducer means for decoding the particular channel identification code of said reproduced digital video signals and thereby detect the particular channel of said reproduced digital video signals.

4. The apparatus of claim 3 wherein said signal interchange means comprises plural switching means, each being connected to a respective channel output and each being coupled to receive the digital video signals that have been reproduced by all of said transducer means; and switch control means responsive to the decoded channel identification codes of each reproduced digital video signal to selectively activate respective ones of said switching means to transmit said digital video signals to those channel outputs identified by said decoded channel identification codes.

5. The apparatus of claim 4 wherein said plural switching means comprises plural multiplexing means, each being coupled to a respective channel output and each having inputs connected to receive the digital video signals that have been reproduced by said respective transducer means; and wherein said switch control means comprises multiplex control means.

6. The apparatus of claim 5 wherein said multiplex control means comprises plural data identification generating means, each coupled to a respective one of said decoding means to generate data identification signals in response to said decoded channel identification code, said data identification signals enabling respective ones of said multiplexing means to transmit digital video signals to channel outputs corresponding to said channel identification codes regardless of the particular transducer means which have reproduced said digital video signals.

7. The apparatus of claim 6 wherein said multiplex control means further comprises plural multiplex control signal generating means, each coupled to receive selected ones of the data identification signals generated by each said data identification generating means to supply multiplex control signals to a corresponding one of said multiplexing means and thereby enable said corresponding multiplexing means to transmit the correct digital video signal to the channel output coupled thereto; and means for preferentially enabling said corresponding multiplexing means to transmit the correct digital video signal which has been reproduced by the transducer means associated with said channel output coupled thereto instead of the correct digital video signal which has been reproduced by a different transducer means.

8. The apparatus of claim 4 wherein said signal interchange means further comprises plural memory means, each being connected to receive and temporarily store the digital video signals reproduced by a transducer means associated with a respective channel, and for supplying the digital video signals stored therein to at least those switching means which are connected to channel outputs that differ from said respective channel.

9. Apparatus for reproducing a digital video signal which is recorded in separate tracks on a record medium, each track being associated with a respective channel and having sub-blocks of digital data recorded therein, each line interval of video information being represented by at least one sub-block in each of plural tracks, and each sub-block containing a channel identification code to identify the channel of said sub-block, said apparatus comprising:

plural transducer means, each associated with a respective channel and each normally operative to reproduce sub-blocks from a respective one of said tracks;

plural time base correcting means, each associated with a respective channel for correcting time base errors in the sub-blocks reproduced by a corresponding one of said transducer means;

plural error correcting means, each associated with a respective channel and including field memory means for storing the sub-blocks of said respective channel which are included in a field interval of video information; and data interchange means coupled to said plural time base correcting means for receiving the sub-blocks whose time base errors have been corrected and for directing said sub-blocks to the field memory means of the error correcting means associated with the channel identified by said channel identification codes thereof regardless of the particular transducer means which reproduced said sub-blocks.

10. The apparatus of claim 9 wherein each sub-block further contains an address code to identify the relative location of that sub-block in a field interval of sub-blocks, and wherein said field memory means includes a plurality of storage locations for storing corresponding sub-blocks identified by said address code.

11. The apparatus of claim 9 wherein each time base correcting means comprises plural buffer memory means, each having a storage capacity of at least one sub-block, and memory control means for writing successive sub-blocks reproduced from said corresponding transducer means into said buffer memory means in sequence, for reading sub-blocks out of said buffer memory means in sequence and for re-reading a sub-block out of the same buffer memory means in the event that the next buffer memory means in said sequence then is having a sub-block written therein; and wherein said data interchange means comprises means for detecting the re-reading of a sub-block out of the same memory means, and means for inhibiting a re-read sub-block from being directed to the field memory means associated with the same channel as the time base correcting means from which said sub-block was re-read.

12. The apparatus of claim 9 wherein said data interchange means comprises plural memory means, each associated with a respective channel and each having a storage capacity of at least one sub-block; memory control means for writing a sub-block received from the time base correcting means associated with a particular channel into the memory means associated with the same channel; plural switch means, each associated with a respective channel and each supplied with a sub-block received from the time base correcting means associated with the same channel as well as sub-blocks stored in the memory means associated with different channels; and switch control means for controlling each switch means to select only the sub-blocks supplied thereto whose channel identification codes identify the same channel with which said switch means is associated.

13. The apparatus of claim 12 wherein said switch control means comprises plural decoding means, each supplied with a sub-block received from a respective time base correcting means for decoding said channel identification code to detect the particular channel of said sub-block, and selection signal generating means responsive to the detected channel of said sub-block to enable the corresponding switch means to select that sub-block.

14. The apparatus of claim 9 wherein said record medium is a magnetic tape and said separate tracks are parallel, skewed tracks.

15. The apparatus of claim 14 wherein said plural transducer means comprise plural rotary magnetic heads, each associated with a respective, designated channel; and wherein said heads scan tracks associated with channels which differ from said designated channels during special reproducing modes.

16. Video signal reproducing apparatus for reproducing digital video signals which are recorded in parallel, skewed tracks on a magnetic tape at recording speeds which differ from the reproducing speeds, each track being associated with a designated channel and containing digital data which represents only a portion of the video information normally contained within a field interval, said apparatus comprising:

plural rotary magnetic heads associated with respective ones of said designated channels for simultaneously scanning a predetermined number of said tracks, each head normally operative to reproduce data from the same channel as said designated channel associated with said head and operative in special reproducing modes to reproduce data from a channel which differs from that of said designated channel associated with said head;

memory means having storage locations associated with respective ones of said channels for storing the data reproduced from said magnetic tape;

means for receiving the data reproduced by each head and for supplying said data to said memory means for storage in the storage location associated with the same channel as that associated with said data regardless of the particular head which reproduced that data; and means for reading out the data stored in said memory means to recover field intervals of video information.

* * * * *